US011184670B2

(12) United States Patent
Choi et al.

(10) Patent No.: US 11,184,670 B2
(45) Date of Patent: Nov. 23, 2021

(54) DISPLAY APPARATUS AND CONTROL METHOD THEREOF

(71) Applicant: SAMSUNG ELECTRONICS CO., LTD., Suwon-si (KR)

(72) Inventors: Jiwoong Choi, Suwon-si (KR); Younguk Kim, Suwon-si (KR); Yoonhee Choi, Suwon-si (KR); Minsoo Kim, Suwon-si (KR); Hyosang Kim, Suwon-si (KR); Hyunsoo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/690,544

(22) Filed: Nov. 21, 2019

(65) Prior Publication Data
US 2020/0196007 A1 Jun. 18, 2020

(30) Foreign Application Priority Data
Dec. 18, 2018 (KR) .................. 10-2018-0163755

(51) Int. Cl.
*H04N 21/4415* (2011.01)
*G06K 9/00* (2006.01)
(Continued)

(52) U.S. Cl.
CPC ..... *H04N 21/4415* (2013.01); *G06K 9/00744* (2013.01); *G06K 9/6215* (2013.01);
(Continued)

(58) Field of Classification Search
CPC ........... H04N 21/4394; H04N 21/4396; H04N 21/44; H04N 21/4402
(Continued)

(56) References Cited

U.S. PATENT DOCUMENTS 6,636,609 B1  10/2003  Ha
7,266,287 B2   9/2007  Zhang
(Continued)

FOREIGN PATENT DOCUMENTS

CN  103002328  3/2013
EP  1 653 381  5/2006
(Continued)

OTHER PUBLICATIONS

Extended Search Report and Written Opinion dated Feb. 12, 2020 in counterpart European Patent Application No. 19210566.6.
(Continued)

*Primary Examiner* — Nasser M Goodarzi
*Assistant Examiner* — Jaycee Imperial
(74) *Attorney, Agent, or Firm* — Nixon & Vanderhye P.C.

(57) ABSTRACT

A display apparatus is provided. The display apparatus according to an embodiment includes a display, a memory configured to store UI pattern information, a communication interface comprising communication circuitry, and a processor configured to control the display apparatus to obtain identification information indicating a type of changed multimedia content from the memory based on UI pattern information obtained from the changed multimedia content based on an event that changes a multimedia content output through the display occurring, control the communication interface to: transmit the identification information and fingerprint obtained from the changed multimedia content to a server, and receive content information corresponding to the fingerprint obtained based on the identification information from the server.

18 Claims, 19 Drawing Sheets

(51) Int. Cl.
*G06K 9/62* (2006.01)
*G06T 3/40* (2006.01)
*H04N 21/439* (2011.01)
*H04N 21/44* (2011.01)
*H04N 21/4402* (2011.01)
*H04N 21/45* (2011.01)
*H04N 21/466* (2011.01)
*H04N 21/472* (2011.01)

(52) U.S. Cl.
CPC .............. *G06K 9/6256* (2013.01); *G06T 3/40* (2013.01); *H04N 21/4394* (2013.01); *H04N 21/4396* (2013.01); *H04N 21/44* (2013.01); *H04N 21/4402* (2013.01); *H04N 21/4532* (2013.01); *H04N 21/4662* (2013.01); *H04N 21/47217* (2013.01)

(58) Field of Classification Search
USPC .......................................................... 725/19
See application file for complete search history.

(56) References Cited

U.S. PATENT DOCUMENTS

| | | | |
|---|---|---|---|
| 7,765,564 B2 * | 7/2010 | Deng | H04H 60/58 725/18 |
| 7,903,098 B2 | 3/2011 | Tokimoto | |
| 7,975,285 B2 | 7/2011 | Takegoshi | |
| 8,019,162 B2 | 9/2011 | Zhang et al. | |
| 8,819,717 B2 | 8/2014 | Deng | |
| 8,843,990 B1 | 9/2014 | Haberman et al. | |
| 8,856,817 B2 | 10/2014 | Sinha et al. | |
| 9,146,990 B2 | 9/2015 | Scherf et al. | |
| 9,301,008 B2 | 3/2016 | Park et al. | |
| 9,319,740 B2 | 4/2016 | Sinha et al. | |
| 9,473,820 B2 | 10/2016 | Mallinson | |
| 9,495,451 B2 | 11/2016 | Harron | |
| 9,565,456 B2 | 2/2017 | Helferty | |
| 9,576,473 B2 | 2/2017 | Navin et al. | |
| 10,045,073 B2 | 8/2018 | Seo et al. | |
| 10,219,011 B2 | 2/2019 | Jung et al. | |
| 2005/0154952 A1 | 7/2005 | Kawada | |
| 2007/0061833 A1 | 3/2007 | Deng | |
| 2007/0209055 A1 | 9/2007 | Koga et al. | |
| 2007/0212030 A1 | 9/2007 | Koga et al. | |
| 2008/0082995 A1 | 4/2008 | Tanaka | |
| 2008/0127253 A1 | 5/2008 | Zhang | |
| 2009/0066845 A1 | 3/2009 | Okuda | |
| 2010/0053452 A1 | 3/2010 | Abe | |
| 2010/0123823 A1 | 5/2010 | Kim | |
| 2011/0275311 A1 | 11/2011 | Buehler et al. | |
| 2011/0276882 A1 | 11/2011 | Buehler | |
| 2012/0117584 A1 | 5/2012 | Gordon | |
| 2012/0324499 A1 | 12/2012 | Deng | |
| 2013/0218735 A1 * | 8/2013 | Murray | G06Q 40/123 705/31 |
| 2013/0331971 A1 | 12/2013 | Bida | |
| 2014/0082646 A1 | 3/2014 | Sandland | |
| 2014/0101683 A1 | 4/2014 | Arshavski et al. | |
| 2014/0181853 A1 | 6/2014 | Dureau | |
| 2014/0230002 A1 | 8/2014 | Kitazato | |
| 2014/0282668 A1 | 9/2014 | Gava et al. | |
| 2015/0089535 A1 | 3/2015 | Moon et al. | |
| 2015/0334459 A1 | 11/2015 | Oh et al. | |
| 2016/0073047 A1 | 3/2016 | Yabu | |
| 2016/0112768 A1 | 4/2016 | Kim et al. | |
| 2016/0127759 A1 | 5/2016 | Jung et al. | |
| 2016/0286263 A1 | 9/2016 | Jung et al. | |
| 2016/0316261 A1 * | 10/2016 | Koshevoy | H04N 21/812 |
| 2016/0316262 A1 | 10/2016 | Chen | |
| 2017/0171609 A1 | 6/2017 | Koh | |
| 2017/0201793 A1 | 7/2017 | Pereira et al. | |
| 2017/0208353 A1 | 7/2017 | Kim et al. | |
| 2017/0238065 A1 | 8/2017 | Jang et al. | |
| 2017/0295400 A1 | 10/2017 | Jang et al. | |
| 2018/0035149 A1 | 2/2018 | Choi et al. | |
| 2019/0050666 A1 | 2/2019 | Kim et al. | |
| 2019/0138911 A1 * | 5/2019 | Kadochnikov | G06N 5/041 |
| 2020/0133643 A1 * | 4/2020 | Hou | G06K 9/6215 |
| 2020/0310952 A1 * | 10/2020 | Shani | G06F 11/3466 |

FOREIGN PATENT DOCUMENTS

| | | |
|---|---|---|
| EP | 1 668 914 | 6/2006 |
| EP | 2 608 107 | 6/2013 |
| EP | 2 763 427 A1 | 8/2014 |
| EP | 2 916 554 | 9/2016 |
| EP | 3 334 172 A1 | 6/2018 |
| EP | 3 340 639 | 6/2018 |
| EP | 3 399 765 A1 | 11/2018 |
| JP | 4967998 | 7/2012 |
| JP | 5277582 | 8/2013 |
| JP | 2015-162865 | 9/2015 |
| KR | 10-1237229 | 2/2013 |
| KR | 10-2013-0124911 | 11/2013 |
| KR | 10-1377849 | 3/2014 |
| KR | 10-2015-0030185 | 3/2015 |
| KR | 10-2016-0053549 | 5/2016 |
| KR | 10-1644956 | 8/2016 |
| KR | 10-2016-0115264 | 10/2016 |
| KR | 10-1747776 | 6/2017 |
| KR | 10-2017-0101076 | 9/2017 |
| KR | 10-2018-0014657 | 2/2018 |
| KR | 10-1873364 | 8/2018 |
| WO | WO 2005/032145 | 4/2005 |
| WO | WO 2014-082353 A1 | 6/2014 |
| WO | WO 2017/146454 | 8/2017 |

OTHER PUBLICATIONS

Montagnuolo, Maurizio et al., "Automatic Genre Classification of TV Programmes Using Gaussian Mixture Models and Neural Networks," 18th International Workshop on Database and Expert Systems Applications, Sep. 1, 2007, Piscataway, NJ, USA, pp. 99-103.
International Search Report for PCT/KR2019/003304 dated Jul. 10, 2019 w/ English Translation, 6 pages.
Written Opinion of the ISA for PCT/KR2019/003304 dated Jul. 10, 2019 w/ English Translation, 10 pages.
International Search Report for PCT/KR2019/006495 dated Sep. 19, 2019, 3 pages.
Written Opinion of the ISA for PCT/KR2019/006495 dated Sep. 19, 2019, 5 pages.
European Office Action dated Sep. 29, 2020 for EP Application No. 19806480.0.
U.S. Office Action dated Oct. 1, 2020 for U.S. Appl. No. 16/431,886; Choi.
Extended EP Search Report dated Feb. 4, 2021 for EP Application No. 19827383.1.
U.S. Office Action dated Jan. 29, 2021 based on U.S. Appl. No. 16/431,886; Choi.
European Examination Report dated May 25, 2021 for EP Application No. 19210566.6.
Result of Consultation dated Jul. 9, 2021 for EP Application No. 19210566.6 (3pgs.
Result of Consultation dated Jul. 13, 2021 for EP Application No. 19210566.6 (4pgs).
Notice of Allowance (dated Jul. 29, 2021) issued by the U.S. Patent Office for U.S. Appl. No. 16/431,886,filed Jun. 5, 2019; Choi.

* cited by examiner

001 Drama
friends(Jane)(EPISODE 1)      03:43                    >
03:00~04:00

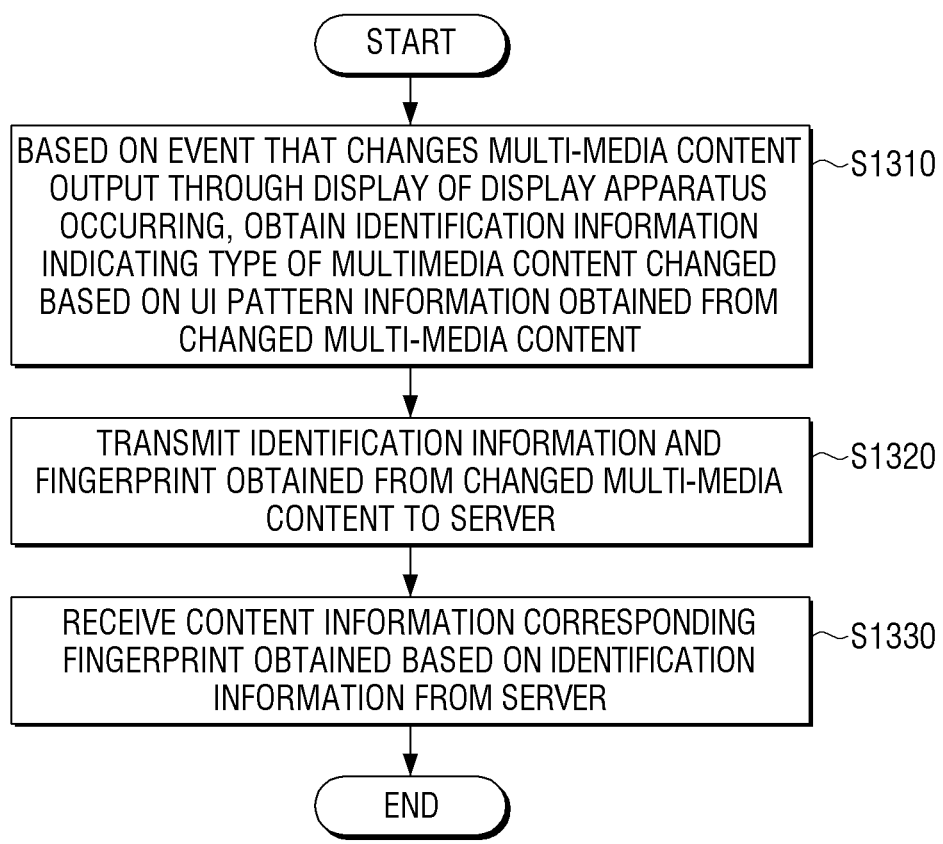

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2018-0163755, filed on Dec. 18, 2019, in the Korean Intellectual Property Office, the disclosure of which is incorporated by reference herein in its entirety.

BACKGROUND

1. Field

The disclosure relates to a display apparatus and a control method thereof, and for example, to a display apparatus configured to identify a multimedia content which is being output and a control method thereof.

The disclosure also relates to an artificial intelligence (AI) system that simulates functions of human brain such as recognition, determination, etc. using a machine learning algorithm, and an application thereof.

2. Description of Related Art

Recently, artificial intelligence systems that implement human-level artificial intelligence (AI) have been used in various fields. An artificial intelligence system is a system in which the machine learns, judges and becomes smart, unlike a conventional rules-based smart system. The more the artificial intelligence system is used, the higher the recognition rate and the better understanding of user's preferences. Thus, the conventional rule-based smart system has been gradually replaced by a deep-learning based artificial intelligence system.

Artificial intelligence technology includes machine learning (e.g., deep-learning) and element technologies that use machine learning.

Machine learning may refer to an algorithm technology that classifies/trains the characteristics of input data by itself. Element technology may refer to a technology that simulates functions, such as recognition and judgment of the human brain, using a machine learning algorithm such as deep learning and includes linguistic understanding, visual understanding, reasoning/prediction, knowledge representation, motion control, etc.

Artificial intelligence technology may be applied to various fields, examples of which are described below. Linguistic understanding may refer, for example, to a technology for recognizing and applying/processing human language/characters, including natural language processing, machine translation, dialogue system, query response, speech recognition/synthesis, and the like. Visual comprehension may refer, for example, to a technology for recognizing and processing an object as if perceived by a human being, including object recognition, object tracking, image search, human recognition, scene understanding, spatial understanding, image enhancement, etc. Inference prediction may refer, for example, to a technology for judging and logically inferring and predicting information, including knowledge/probability-based reasoning, optimization prediction, preference-bases planning, and recommendations. Knowledge representation may refer, for example, to a technology for automating human experience information into knowledge data, including knowledge building (data generation/classification) and knowledge management (data utilization). Motion control may refer, for example, to a technology for controlling the autonomous movements of a device or object, e.g., travel of a vehicle and the motion of a robot, including motion control (navigation, collision and traveling), operation control (behavior control), and the like.

For fingerprint based content recognition, a fingerprint of a content to be recognized is extracted and mapped to the title of the content to be stored in a server. In addition, when a fingerprint for a present screen is extracted from a TV and transmitted to a server, the server identifies the presence of a matched fingerprint, and provides the content title for the matched fingerprint and related information to the TV.

However, at present, a plurality of servers are provided for content recognition of a large amount of contents, and a fingerprint is transmitted to all of the plurality of servers. Part of the plurality of severs includes information corresponding to the fingerprint, but others do not. In other words, there is a problem that unnecessary search query occurs in other servers.

SUMMARY

Embodiments of the disclosure relate to providing a display apparatus for reducing sever costs that occur in the process of identifying a content and a controlling method thereof.

According to an example embodiment, a display apparatus is provided, the display apparatus including a display, a memory configured to store UI pattern information, a communication interface comprising interface circuitry, and a processor configured to control the display apparatus to, based on an event that changes a multimedia content output through the display occurring, obtain identification information indicating a type of the changed multimedia content from the memory based on UI pattern information obtained from the changed multimedia content, control the communication interface to transmit the identification information and a fingerprint obtained from the changed multimedia content to a server, and receive content information corresponding to the fingerprint obtained based on the identification information from the server through the communication interface.

The processor may be further configured to control the communication interface to transmit the fingerprint to at least one server corresponding to the identification information among a plurality of servers, and receive the content information from the at least one server through the communication interface.

The processor may be further configured to control the display apparatus to, based on the identification information corresponding to the obtained UI pattern information not being stored in the memory, transmit the fingerprint to a plurality of servers, receive the content information and the identification information from one of the plurality of servers through the communication interface, and map the received identification information to the UI pattern information to store the identification information in the memory.

The processor may be further configured to control the display apparatus to identify that an event that changes the multimedia content occurs based on an audio output being changed to a mute state while the multimedia content is being output.

The processor may be further configured to control the display apparatus to, based on the event occurring, obtain a plurality of UI patterns from the changed multimedia content at predetermined time intervals, and obtain the UI pattern information from the plurality of UI patterns.

The processor may be further configured to control the display apparatus to identify a plurality of UI patterns from each of a plurality of multimedia contents output through the display at predetermined time intervals, perform grouping of the plurality of UI patterns based on a similarity of the plurality of UI patterns, and store the grouped UI pattern in the memory as the UI pattern information.

The processor may be further configured to control the display apparatus to obtain the UI pattern information from the changed multimedia content based on a UI pattern identification model stored in the memory, wherein the UI pattern identification model is obtained by training a plurality of sample frames and a plurality of sample UI patterns included in the plurality of sample frames through an artificial intelligence algorithm.

The processor may be further configured to control the display apparatus to identify whether the obtained UI pattern information corresponds to the stored UI pattern information based on the UI pattern identification model.

The processor may be further configured to control the display apparatus to change a resolution of a frame included in the multimedia content to a predetermined resolution, and obtain the UI pattern information from a frame changed to the predetermined resolution.

The identification information may include at least one of a channel that provides the multimedia content, a content provider that provides the multimedia content, or a connection method of an electronic apparatus that provides the multimedia content and the display apparatus.

According to an example embodiment, a method for controlling a display apparatus is provided, the method including obtaining identification information indicating a type of changed multimedia content based on UI pattern information obtained from the changed multimedia content based on an event that changes a multimedia content being output through a display of the display apparatus, transmitting the identification information and a fingerprint obtained from the changed multimedia content to a server, and receiving content information corresponding to the fingerprint obtained based on the identification information from the server.

The transmitting may include transmitting the fingerprint to at least one server corresponding to the identification information among a plurality of servers, wherein the receiving comprises receiving the content information from the at least one server.

The transmitting may include, based on the identification information corresponding to the obtained UI pattern information not being obtained, transmitting the fingerprint to a plurality of servers, wherein the receiving comprises receiving the content information and the identification information from one of the plurality of servers, and wherein the controlling comprises mapping the received identification information to the UI pattern information and storing the identification information.

The obtaining may include, based on an audio output being changed to a mute state while the multimedia content is being output, identifying that an event that changes the multimedia content occurs.

The obtaining may include, based on the event occurring, obtaining a plurality of UI patterns from the changed multimedia content at predetermined time intervals, and obtaining the UI pattern information from the plurality of UI patterns.

The method may further include identifying a plurality of UI patterns from each of a plurality of multimedia contents output through the display at predetermined time intervals, performing grouping of the plurality of UI patterns based on a similarity of the plurality of UI patterns, and storing the grouped UI pattern as the UI pattern information.

The obtaining may include obtaining the UI pattern information from the changed multimedia content based on a UI pattern identification model, wherein the UI pattern identification model is obtained by training a plurality of sample frames and a plurality of sample UI patterns included in the plurality of sample frames through an artificial intelligence algorithm.

The obtaining may include identifying whether the obtained UI pattern information corresponds to pre-stored UI pattern information based on the UI pattern identification model.

The obtaining may include changing a resolution of a frame included in the multimedia content to a predetermined resolution, and obtaining the UI pattern information from a frame changed to the predetermined resolution.

The identification information may include at least one of a channel that provides the multimedia content, a content provider that provides the multimedia content, or a connection method of an electronic apparatus that provides the multimedia content and the display apparatus.

According to the above-described various example embodiments, the display apparatus may reduce the server query of the server by constructing the UI pattern information and providing identification information indicating the type of multimedia content obtained from the constructed UI pattern information to the server, thereby reducing the server construction costs.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 13 is a flowchart illustrating an example method for controlling a display apparatus according to an embodiment of the disclosure.

DETAILED DESCRIPTION

Figure 1:
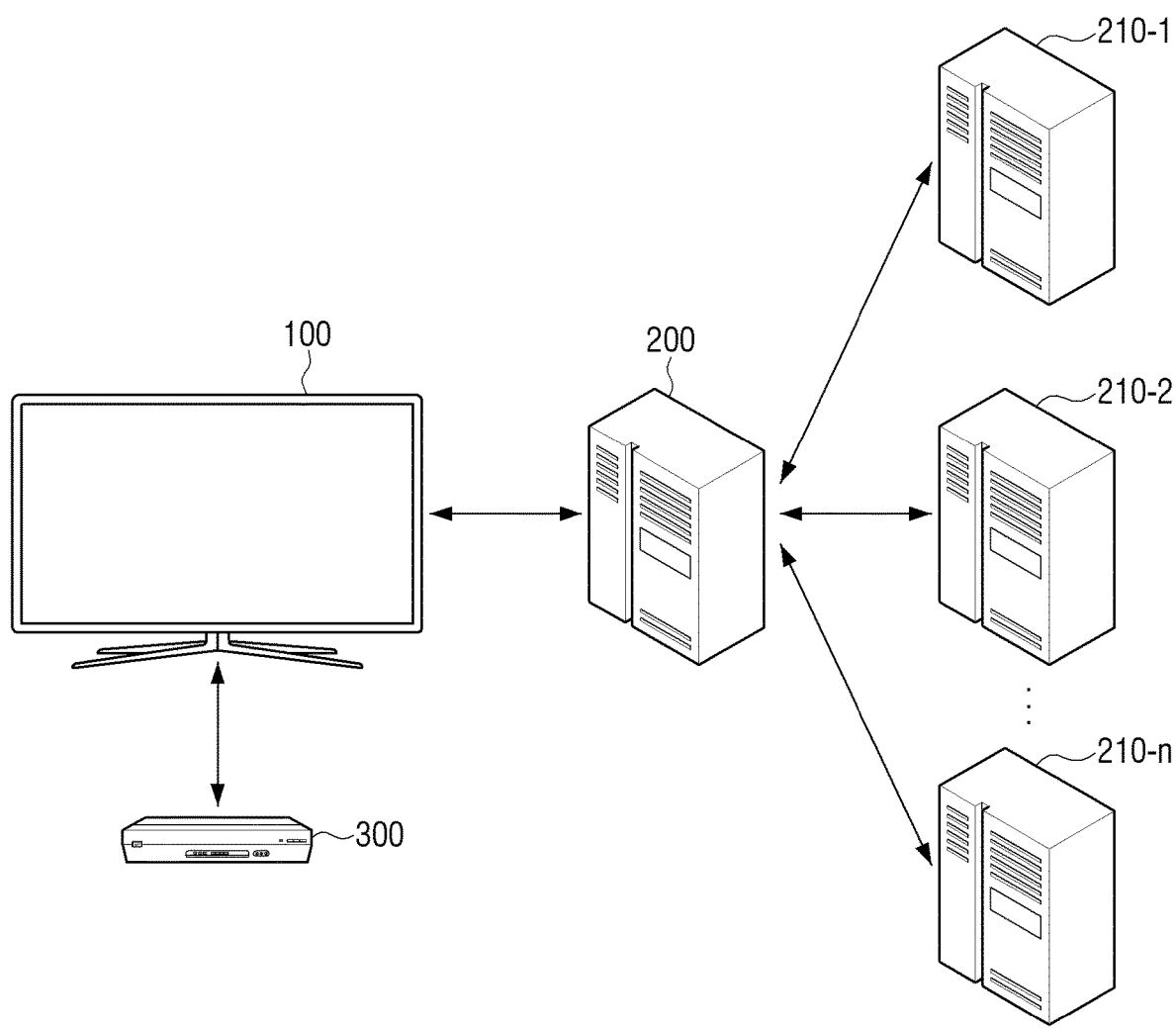
FIG. 1 is a diagram illustrating an example electronic system according to an embodiment of the disclosure.

The example embodiments of the present disclosure may be diversely modified. Accordingly, various example embodiments are illustrated in the drawings and are described in greater detail in the detailed description. However, it is to be understood that the present disclosure is not limited to a specific example embodiment, but includes all modifications, equivalents, and substitutions without departing from the scope and spirit of the present disclosure. Also, well-known functions or constructions may not be described in detail where they would obscure the disclosure with unnecessary detail.

Hereinafter, the disclosure will be described in greater detail with reference to the accompanying drawings.

The terms used in this disclosure including technical and scientific terms have the same meanings as would be generally understood by those skilled in the related art. However, these terms may vary depending on the intentions of the person skilled in the art, legal or technical interpretation, and the emergence of new technologies. In addition, some terms may be arbitrarily selected. These terms may be understood as having the meaning defined herein and, unless otherwise specified, may be understood based on the contents of this disclosure and common technical knowledge in the art.

In this disclosure, terms such as 'include' and 'have/has' should be understood as designating that there are such features (e.g., numbers, operations, elements, or components), not to exclude the existence or possibility of adding one or more of other features.

In the disclosure, the expressions "A or B," "at least one of A and/or B," or "one or more of A and/or B," and the like include all possible combinations of the listed items.

Terms such as 'first' and 'second' may be used to refer to various elements regardless of order and/or importance and do not limit the elements. Those terms are used for the purpose of differentiating a component from other components.

When an element (e.g., a first element) is referred to as being "operatively or communicatively coupled to" or "connected to" another element (e.g., a second element), it should be understood that each element may be directly connected or indirectly connected via another element (e.g., a third element).

The singular expression also includes the plural so long as it does not conflict with the context. In this disclosure, terms such as 'include' and 'have/has' should be understood as designating that there are such features, numbers, operations, elements, components or a combination thereof in the disclosure, not to exclude the existence or possibility of adding one or more of other features, numbers, operations, elements, components or a combination thereof.

In an example embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

In this disclosure, the term 'user' refers to a person using an electronic apparatus or an apparatus using an electronic apparatus (e.g., an artificial intelligence electronic apparatus).

Hereinafter, example embodiments of the disclosure will be described in greater detail with reference to the accompanying drawings.

FIG. 1 is a diagram illustrating an example electronic system 1000 according to an embodiment of the disclosure. Referring to FIG. 1, an electronic system 1000 may include a display apparatus 100, a main server 200, a plurality of sub-servers 210-1 to 210-n, and an electronic apparatus 300.

The display apparatus 100 may be configured to output multi-media contents. For example, the display apparatus 100 may include a display such as, for example, and without limitation, a TV, a desk top PC, a laptop, a smartphone, a table PC, a smart glasses, a smart watch, etc., and output a multi-media content received from the electronic apparatus 300. However, the disclosure is not limited thereto, and any type of display apparatus could be used for the display apparatus 100 so long as it receives a multi-media content from the electronic apparatus 300.

The display apparatus 100 may not identify which type of content the multi-media content is because it may receive the multi-media content from the electronic apparatus 300 in real time. The display apparatus 100 may obtain a fingerprint from the multi-media content for identifying the multi-media content, and transmit the obtained fingerprint to the main server 200.

The fingerprint may be identification information that distinguishes a frame from another frame, which may refer, for example, to unique data of each frame. The fingerprint may be feature data extracted from at least one of, for example, and without limitation, a video signal, an image signal, or an audio signal, or the like, included in the frame, and unlike text-based metadata, may reflect the unique feature of a signal itself. Therefore, the fingerprint may, for example, be referred to as fingerprint data, DNA data or genetic data, or the like. For example, in the case of an image signal or a video signal, the fingerprint may, for example, and without limitation, be data for expressing features such as motion vector, color, etc.

The fingerprint may be extracted by various algorithms known to the art. For example, an audio signal may be divided by predetermined time intervals, and the magnitudes of signals of frequencies included in each time interval may be calculated. Fingerprint data may be generated by way of calculating a frequency slope by obtaining a magnitude difference between signals in adjacent frequency intervals, and quantizing the gradient to 1 when the slope is positive, and to 0 when the slope is negative. However, the disclosure is not limited thereto, but the fingerprint may be obtained using various methods.

The display apparatus 100 may obtain UI pattern information from the multimedia content. The UI pattern information may refer, for example, to a layout that displays information such as the title, the channel number, the show time, the performer, etc. of the multi-media content. The UI pattern information may vary depending on channels, contents providers, etc.

The display apparatus 100 may obtain identification information indicating the type of multimedia content based on the UI pattern information. For example, the display apparatus 100 may be in a state where UI pattern information corresponding to a plurality of UI patterns and the corresponding identification information is stored. The display apparatus 100 may be in a state where identification information according to UI patterns is stored or not. For example, the display apparatus 100 may be in a state in which the first identification information corresponding to the first UI pattern information is stored, but that fails to store the second identification information corresponding to the second UI pattern information. The identification information may include, for example, and without limitation, at least one of a channel that provides the multimedia content, a content provider that provides a multimedia content, or a connection method between the electronic apparatus 300 for providing the multimedia content and the display apparatus, etc. The display apparatus 100 may identify whether the UI pattern information obtained from the multimedia contents is pre-stored or not. The display apparatus 100 may identify whether the corresponding identification information is pre-stored or not even if the UI pattern information obtained from the multi-media content is pre-stored.

When identification information is obtained, the display apparatus 100 may transmit a fingerprint and the identification information to the main server 200, when the identification information is not received, the display apparatus 100 may transmit only the fingerprint to the main server 200.

When the fingerprint and the identification information are transmitted to the main server 200, the display apparatus 100 may receive content information corresponding to the fingerprint from the main server 200. When only the fingerprint is transmitted to the main server 200, the display apparatus 100 may receive the content information and the identification information corresponding to the fingerprint from the main server 200. In this case, the display apparatus 100 may map the identification information to the UI pattern information and store the identification information.

The main server 200 may receive the fingerprint from the display apparatus 100, and transmit the received fingerprint to the plurality of sub-servers 210-1 to 210-n. The main server 200 may transmit the fingerprint to at least one sub-server corresponding to the identification information among the plurality of sub-servers 210-1 to 210-n when further receiving the identification information as well as the fingerprint from the display apparatus 100, but may not transmit the fingerprint to other sub-servers.

The main server 200 may receive content information corresponding to the fingerprint from one of the plurality of sub-servers 210-1 to 210-n. The main server 200 may transmit only the content information to the display apparatus 100 when receiving the fingerprint and the identification information from the display apparatus 100. When receiving only the fingerprint from the display apparatus 100, the main server 200 may transmit the content information and the identification information to the display apparatus 100.

The main server 200 may obtain identification information based on a sub-server that provides content information among the plurality of sub-servers 210-1 to 210-n. For example, if a sub-server that provides content information to the main server 200 among the plurality of sub-servers 210-1 to 210-n is a content server, the main server 200 may provide identification information which is a live content to the display apparatus 100.

The plurality of sub-servers 210-1 to 210-n may be servers including the fingerprint, and may be servers that output the corresponding content information when the fingerprint is received.

The plurality of sub-servers 210-1 to 210-n may be sub-servers distinguished based on identification information. For example, the first sub-server among the plurality of sub-servers 210-1 to 210-n may be a live content server that stores the fingerprint with respect to the live content, and the second sub-server among the plurality of sub-servers 210-1 to 210-n may be a DVR content server that stores the fingerprint with respect to a DVR content. The plurality of sub-servers 210-1 to 210-n may include a plurality of live content servers.

The electronic apparatus 300 may be an apparatus that transmits multimedia contents to the display apparatus 100 such as a set-top box. However, the disclosure is not limited thereto. Any type of apparatus could be used as the electronic apparatus 300 so long as it transmits multimedia contents to the display apparatus 100.

FIG. 1 illustrates that the electronic system 1000 includes the main server 200, but the electronic system 1000 may not include the main server 200. In this example, the display apparatus 100 may directly transmit a fingerprint to the plurality of sub-server 210-1 to 210-n, or directly transmit the fingerprint to at least one sub-server corresponding to identification information among the plurality of sub-server 210-1 to 210-n.

Figure 2A:
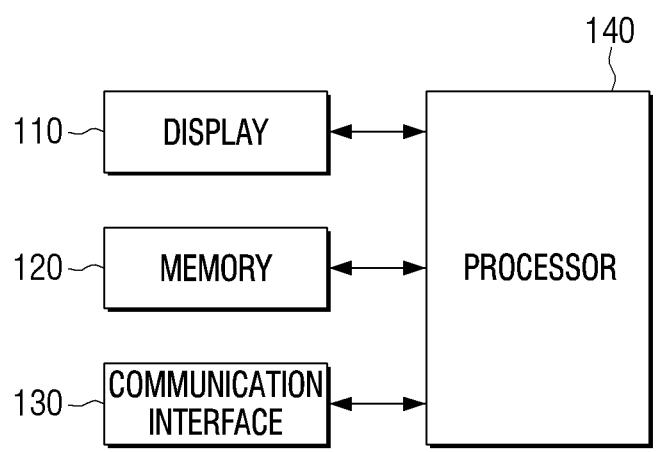
FIG. 2A is a block diagram illustrating an example configuration of a display apparatus according to an embodiment of the disclosure.

FIG. 2A is a block diagram illustrating an example configuration of a display apparatus according to an example embodiment.

Referring to FIG. 2A, a display apparatus 100 may include a display 110, a memory 120, a communication interface (e.g., including communication circuitry) 130 and a processor (e.g., including processing circuitry) 140.

The display 110 may display multimedia content under the control of the processor 140.

The display 110 may be implemented as various types of displays such as, for example, and without limitation, a Liquid Crystal Display (LCD), an Organic Light Emitting Diodes (OLED) display, a Plasma Display Panel (PDP), and the like. The display 110 may also include a driving circuit, a backlight unit, etc., which are implemented in the form of a-si TFT, low temperature poly silicon (LTPS) TFT, organic TFT (OTFT), etc. The display 110 may be implemented as a touch screen in combination with a touch sensor.

The memory 120 may store UI pattern information. UI pattern information may be obtained from the multimedia content by the processor 140 while the multimedia content is being output.

The memory 120 may further store identification information indicating the type of multimedia content. The memory 120 may map the identification information to the UI pattern information and store the identification information. For example, the memory 120 may store the first UI pattern information and the first identification information corresponding to the first UI pattern information, and store the second UI pattern information and the second identification information corresponding to the second UI pattern information.

However, not all the UI pattern information may be mapped to the identification information. For example, the memory 120 may store only the third UI pattern information, but may not store the third identification information corresponding to the third UI pattern information.

The memory 120 may, for example, and without limitation, include a hard disk, a non-volatile memory, a volatile memory, etc.

The communication interface 130 may include various communication circuitry and perform communication with various types of external devices according to various types of communication methods. The processor 140 may perform communication with various external devices using the communication interface 130. For example, the processor 140 may control the communication interface 130 to transmit fingerprint and identification information to the main server 200, and receive content information from the main server 200 through the communication interface 130. The processor 140 may control the communication interface 130 to transmit the fingerprint to the main server 200, and receive the content information and the identification information from the main server 200 through the communication interface 130.

The processor 140 may control the operation of the display apparatus 100 overall.

According to an embodiment, the processor 140 may include various processing circuitry, such as, for example, and without limitation, a digital signal processor (DSP), a microprocessor, a TCON (Time Controller), or the like, but is not limited thereto. The processor 140 may include, for example, and without limitation, one or more of a central processing unit (CPU), a microcontroller unit (MCU), a micro processing unit (MPU), a controller, an application processor (AP), a communication processor (CP), an ARM processor, and the like, or may be defined by the corresponding terms. The processor 120 may be implemented as a system on chip (SoC), a large scale integration (LSI) with a built-in processing algorithm, or in the form of a Field Programmable Gate Array (FPGA).

When an event that changes the multimedia content output through the display 110 occurs, the processor 140 may obtain identification information indicating the type of multimedia content changed based on the UI pattern information obtained from the changed multimedia content from the memory 120. For example, the processor 140 may obtain UI pattern information at predetermined intervals from a plurality of frames included in the multimedia content. When the event that changes the multimedia content occurs, the processor 140 may identify whether the UI pattern information obtained from the multimedia content is pre-stored in the memory 120, and identify whether the identification information corresponding to the UI pattern information is pre-stored in the memory 120.

The processor 140, when the status of an audio output is changed to a mute status while the multimedia content is being output, may identify that the event that changes the multimedia content occurs. The processor 140 may obtain UI pattern information from a plurality of frames included in the multimedia content at predetermined intervals while the multimedia content is being output, and when the UI pattern information is obtained, may identify that the event that changes the multimedia content occurs.

However, the disclosure is not limited thereto. The processor 140 may identify that the multimedia content is changed in various methods. For example, the processor 140 may receive a signal indicating that the multimedia content is changed from the electronic apparatus 300 that provides the multimedia content and identify that the multimedia content is changed. The processor 140 may receive a remote control signal for controlling the change of the multimedia content of the electronic apparatus 300 to identify that the multimedia content is changed.

When an event occurs, the processor 140 may obtain a plurality of UI patterns from the changed multimedia content at predetermined time intervals, and obtain the UI pattern information from the plurality of UI patterns. For example, the processor 140 may identify whether the multimedia content includes a UI pattern for each frame at 0.5 second time intervals, and obtain the UI pattern information from the identified UI pattern. The processor 140 may compare the changed multimedia content with a plurality of frames to obtain the UI pattern information.

The processor 140 may change the resolution of the frame included in the multimedia content to a predetermined resolution, and obtain UI pattern information from the frame that is changed to a predetermined resolution.

For example, the processor 140 may perform downscaling or upscaling of the resolution of the frame included in the multimedia content to the resolution of 480×270, and obtain UI pattern information from the frame that is changed with the resolution of 480×270. Generation of UI pattern information and comparison of UI pattern information may become easier through such an operation.

The processor 140 may control the communication interface 130 to transmit identification information and the fingerprint obtained from the changed multimedia content to the server, and receive the content information corresponding to the fingerprint obtained from the server based on the identification information through the communication interface 130.

The server may include the main server 200, or the plurality of sub-servers 210-1 to 210-n. The processor 140 may transmit the identification information and the fingerprint to the plurality of sub-servers 210-1 to 210-n through the main server 200, or directly transmit the identification information and the fingerprint to the plurality of sub-servers 210-1 to 210-n.

The identification information may include at least one of the channel that provides the multimedia content, the content provider that provides the multimedia content, or the connection method for connecting the electronic apparatus 300 that provides the multimedia content to the display apparatus.

The content information may include the title of the multimedia content. However, the disclosure is not limited thereto. Any type of information could be used as content information so long as it is information for identifying a multimedia content.

The processor 140 may control the communication interface 130 to transmit the fingerprint to at least one server corresponding to the identification information among a plurality of servers, and receive content information from at least one server through the communication interface 130.

For example, the processor 140 may control the communication interface 130 to transmit the fingerprint to at least one sub-server corresponding to identification information among the plurality of sub-servers 210-1 to 210-n, and receive content information from at least one sub-server through the communication interface 130.

When the identification information corresponding to the obtained UI pattern information is not stored in the memory 120, the processor 140 may control the communication interface 130 to transmit the fingerprint to a plurality of servers, receive the content information and the identification information from one of the plurality of servers through the communication interface 130, and map the received identification information to the UI pattern information to store the identification information in the memory 120.

For example, when the identification information corresponding to the obtained UI pattern information is not stored in the memory 120, the processor 140 may control the interface 130 to transmit the fingerprint to the plurality of sub-servers 210-1 to 210-$n$, receive the content information and the identification information from one of the plurality of sub-servers 210-1 to 210-$n$ through the communication interface 130, and map the received identification information to the UI pattern information to store the identification information in the memory 120.

Through the above-described operation, the processor 140 may map UI pattern information that is pre-stored in the memory 120 to the identification information. After the UI pattern information is mapped to the identification information, the fingerprint may be transmitted to only at least one sub-server corresponding to the identification information among the plurality of sub-servers 210-1 to 210-$n$, thereby reducing search query.

The processor 140 may identify a plurality of UI patterns from each of the plurality of multimedia contents output through the display 110 at predetermined time intervals, perform grouping of the plurality of UI patterns based on the similarity of the plurality of UI patterns, and store the grouped UI pattern in the memory 120 as the UI pattern information.

The processor 140 may obtain the UI pattern information from the multimedia content changed based on the UI pattern identification model stored in the memory 120. The UI pattern identification model may be obtained by training a plurality of sample frames and a plurality of sample UI patterns included in the plurality of sample frames through an artificial intelligence algorithm.

The processor 140 may identify whether the UI pattern information obtained based on the UI pattern identification model corresponds to the stored UI pattern information.

Figure 2B:
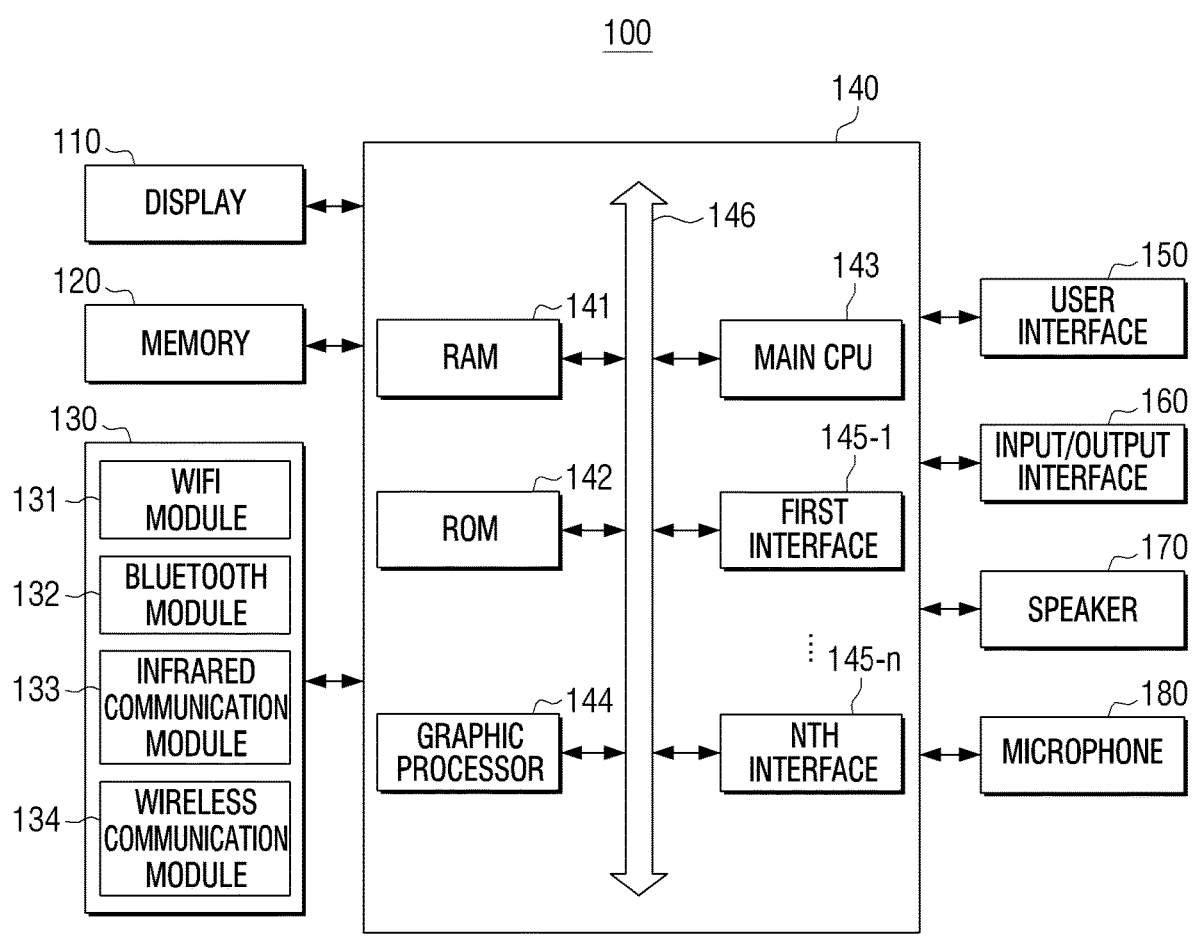
FIG. 2B is a block diagram illustrating an example configuration of a display apparatus according to an embodiment of the disclosure.

FIG. 2B is a block diagram illustrating an example configuration of an example display apparatus according to an embodiment of the disclosure. The display apparatus 100 may include a display 110, a memory 120, a communication interface (e.g., including communication circuitry) 130, and a processor (e.g., including processing circuitry) 140. Referring to FIG. 2B, the display apparatus 100 may further include a user interface (e.g., including user interface circuitry) 150, an input/output interface (e.g., including input/output circuitry) 160, a speaker 170, and a microphone 180. A detailed description of parts shown in FIG. 1A among those shown in FIG. 2B may not be repeated here.

The display 110 may be implemented as various types of displays such as, for example, and without limitation, a Liquid Crystal Display (LCD), an Organic Light Emitting Diodes (OLED) display, a Plasma Display Panel (PDP), and the like. The display 110 may also include a driving circuit, a backlight unit, etc., which may be implemented in the form of a-si TFT, low temperature poly silicon (LTPS) TFT, organic TFT (OTFT), etc. The display 110 may be implemented as a touch screen in combination with a touch sensor, a flexible display, a three dimensional display (3D display), etc.

The memory 120 may be implemented as an internal memory such as a ROM (for example, electrically erasable programmable read-only memory (EEPROM)), a RAM, a separate memory from the processor 140, or the like. The memory 120 may be implemented in the form of a memory embedded in the display apparatus 100, or a removable memory in the display apparatus 100, depending on the purpose of data storage. For example, data for driving the display apparatus 100 may be stored in a memory embedded in the display apparatus 100, and data for an expansion function of the display apparatus 100 may be stored in a memory attachable to or detachable from the display apparatus 100. The memory embedded in the display apparatus 100 may be embodied with at least one of a volatile memory (e.g., dynamic RAM, (DRAM), or static RAM (SRAM), synchronous dynamic RAM (SDRAM), or the like), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (such as NAND flash or NOR flash), a hard drive, or a solid state drive (SSD), etc., but is not limited thereto. The memory removable from the display apparatus 100 may be embodied with a memory card (e.g., a compact flash, a secure digital (SD), a micro secure digital (SD), a mini secure digital (SD), an extreme digital (xD), a multimedia card (MMC), or the like), an external memory connectable to a USB port (e.g., a USB memory), or the like.

The memory 120 may store various data such as an operating system (O/S) software module for driving the display apparatus 100, a UI pattern identification module, a UI pattern information module, and a fingerprint acquisition module.

The processor 140 may include various processing circuitry and control the operation of the display apparatus 100 overall using various programs stored in the memory 120.

The processor 140 may include a RAM 141, a ROM 142, a main CPU 143, a graphic processor (GPU) 144, first to nth interface 144-1 to 144-$n$, and a bus 145.

The RAM 141, the ROM 142, the main CPU 143, the graphic processor 144 and the first to nth interface 144-1 to 124-$n$ may be connected one another through the bus 145.

The ROM 142 may store a command set, etc. for system booting. If a turn-on command is input and power is supplied, the CPU 143 may copy the operation system stored in the memory 120 to the RAM 141 according to the command stored in the ROM 142, execute the operation system and perform booting of the system. When the booting is completed, the CPU 143 may copy various programs stored in the memory 120 to the RAM 141, execute the application program copied to the RAM 141 and perform various operations.

The main CPU 143 may access the memory 120, and perform booting using the O/S stored in the memory 120. The main CPU 143 may perform various operations using various programs, contents data, etc. stored in the memory 120.

The first to nth interface 144-1 to 144-$n$ may be connected to the various elements as described above. One of the interfaces may be a network interface connected to an external apparatus through a network.

The processor 140 may perform a graphic processing (video processing) using, for example, the graphic processor 144. The processor 140 may, through the graphic processor 144, generate a screen including various objects such as icons, images, texts, etc. using a calculation unit (not shown) and a rendering unit (not shown). The calculation unit (not shown) may calculate attribute values such as coordinate values, shapes, sizes, colors, etc. of the objects according to the layout of the screen using the received control command. The rendering unit (not shown) may generate screens of various layouts including objects based on the attribute values calculated by the calculation unit (not shown). The processor 140 may be configured to perform processing of audio data. The processor 120 may perform various processing on video data such as decoding, amplification, noise filtering, etc.

The processor 140 may be configured to perform processing of audio data. The processor 140 may perform various image processes such as decoding, scaling, noise filtering, frame rate conversion, resolution conversion, etc. of audio data.

The communication interface 130 may include various communication circuitry and perform communication with various types of external devices according to various types of communication methods. The communication interface 130 may include various communication circuitry included in various communication modules, such as, for example, and without limitation, a Wi-Fi module 131, a Bluetooth module 132, an infrared communication module 133 and a wireless communication module 134. The communication module may, for example, be embodied as at least one hardware chip.

The processor 140 may perform communication with various external devices using the communication interface 130. The external device may include servers such as an image processing device such as a set-top box, an external server, a control device such as a remote controller, a sound output device such as a Bluetooth speaker, a light device, home appliances such as a smart vacuum cleaner and a smart refrigerator, an IoT home manager, etc.

The Wi-Fi module 131 or the Bluetooth module 132 may perform communication using a Wi-Fi method, and a Bluetooth method, respectively. When Wi-Fi module 131 or the Bluetooth module 132 is used, various connectivity information such as an SSID and a session key may be transmitted and received first, communication connection may be established based on the connectivity information, and various information may be transmitted and received based thereon.

The infrared communication module 133 may perform communication according to an infrared data association (IrDA) technology for transmitting data wirelessly at a short distance using an infrared ray between a time ray and a millimeter wave.

The wireless communication module 134 may include at least one communication chip for forming communication according to various communication standards such as IEEE, ZigBee, 3rd Generation (3G), 3rd Generation Partnership Project (3GPP), Long Term Evolution (LTE), $4^{th}$ Generation (4G), $5^{th}$ Generation (5G), or the like.

In addition, the communication interface 130 may include at least one of a local area network (LAN) module, an Ethernet module, or a wired communication module performing communication using a pair cable, a coaxial cable, or an optical fiber cable.

According to an embodiment, the communication interface 130 may use the same communication module (e.g., a Wi-Fi module) in order to perform communication with an external device such as a remote controller and an external server.

According to another embodiment, the communication interface 130 may use a different communication module (e.g., a Wi-Fi module) in order to perform communication with an external device such as a remote controller and an external server. For example, the interface 130 may use at least one of Ethernet module and Wi-Fi module in order to perform communication with an external server, or BT module to perform communication with an external device such as a remote controller. However, the disclosure is not limited thereto. The communication interface 130 may use at least one of various communication modules when performing communication with a plurality of external devices or an external server.

According to an embodiment, the display apparatus 100 may further include a tuner and a modulator.

The tuner (not shown) may receive an RF broadcast signal by tuning a channel selected by a user or pre-stored all channels among Radio Frequency (RF) broadcast signals received through antenna.

The modulator (not shown) may receive a digital IF signal (DIF) converted by a tuner, modulate the signal, and perform channel demodulation.

The user interface 150 may include various user interface circuitry, such as, for example, and without limitation, a button, a touch pad, a mouse, a keyboard, a touch screen capable of performing the above-described display function and operation input function, or the like. The button may be various types of buttons such as a mechanical button, a touch pad, a whirl, etc. provided in a random area such as a front surface unit, a side surface unit, and a rear surface unit of the outside of the body of the display apparatus 100.

The input/output interface 160 may include various input/output circuitry, such as, for example, and without limitation, one or more of High Definition Multimedia Interface (HDMI), Mobile High-Definition Link (MHL), Universal Serial Bus (USB), Display Port (DP), Thunderbolt, Video Graphics Array (VGA) Port, an RGB port, a D-subminiature (D-SUB), a digital visual interface (DVI), or the likes.

The input/output interface 160 may input and output at least one of an audio signal and a video signal.

According to an embodiment, the input/output interface 160 may include a port for inputting/outputting only audio signals, and a port for inputting/outputting only video signals as being separate ports, or embodied as a single port that inputs and outputs both audio signals and video signals.

The speaker 170 may be configured to output various alarming sounds or voice messages as well as various audio data processed by the input/output interface 160.

The microphone 170 may be configured to receive user voices and other sounds and convert the user voices and the other sounds into audio data.

The microphone 170 may receive a user voice in an activation state. For example, the microphone 170 may be integrally embodied with the display apparatus 100 on its upper side, front side, or sideway. The microphone 170 may have various elements such as a microphone for collecting user voices in the analog format, an amplification circuit for amplifying the collected user voices, an A/D conversion circuit for sampling the amplified user voice and converting the user voice into a digital signal, a filter circuit for removing noise components from the digital signal, etc.

As described above, when the display apparatus 100 further transmits identification information to the main server 200, part of the plurality of sub-servers 210-1 to 210-n may retrieve content information corresponding to the identification information. In other words, as the identification information indicating the type of multimedia content is used, the plurality of sub-servers 210-1 to 210-n may obtain the same content information although part of the sub-servers performs an operation of retrieving content information.

Hereinafter, the operation of the display apparatus 100 will be described in greater detail with reference to the drawings.

Figure 3A:
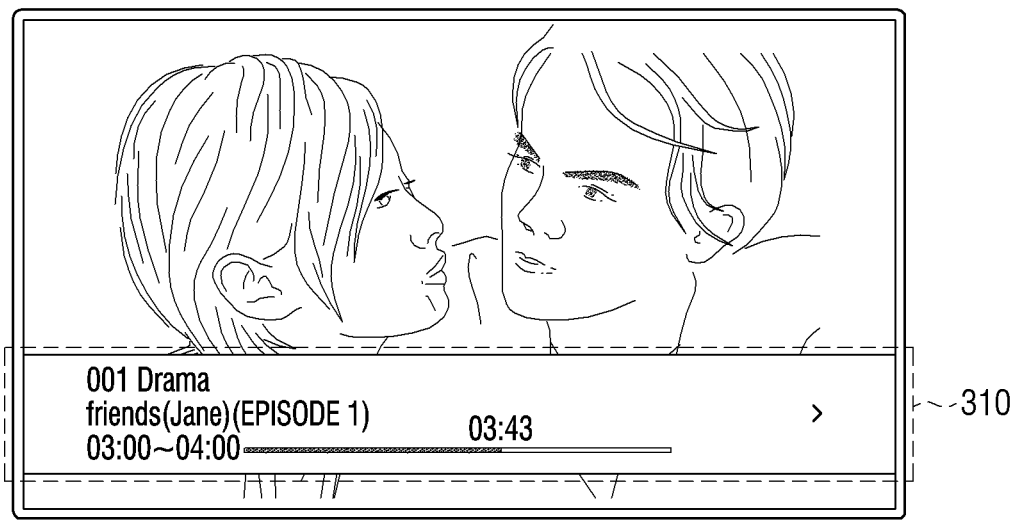
FIG. 3A and FIG. 3B are diagrams illustrating an example UI pattern according to various embodiments of the disclosure.
Figure 3B:
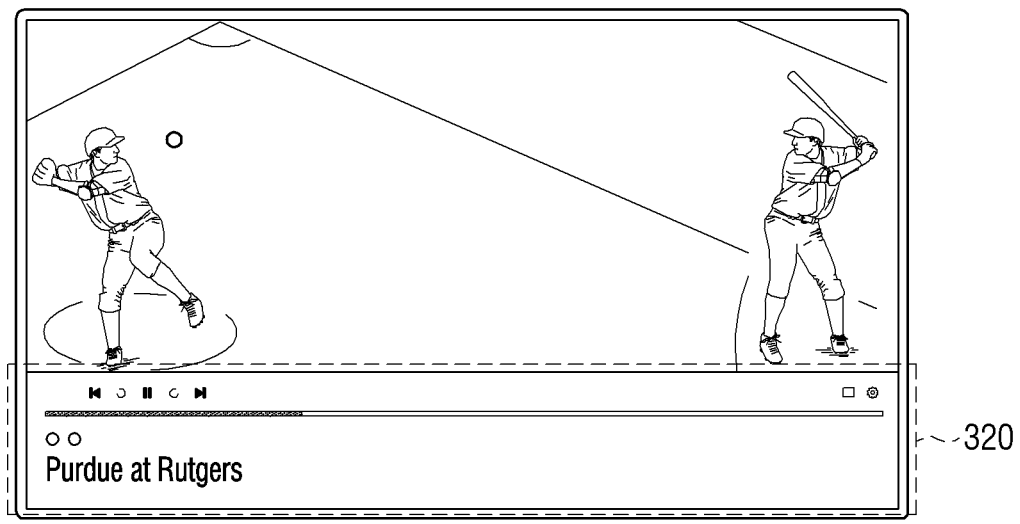

FIG. 3A and FIG. 3B are diagrams illustrating an example UI pattern according to various embodiments of the disclosure.

Referring to FIG. 3A, a first UI pattern 310 may be spaced apart from a lower edge of the frame, including, for example, at least one of the title of the multimedia content (friends), the playback time of the multimedia content (03:00~04:00), the playback time point of the multimedia content (03:43), and the channel information of the multimedia content (001 Drama). The first UI pattern 310 may further the performer information of the multimedia content (Jane) and the episode number of the multimedia (EPISODE 1).

A second UI pattern 320 of FIG. 3B may contact the lower edge of the frame, including at least one of the title of the multimedia content (Purdue at Rutgers), the operation icon, and the playback bar of the multimedia content.

The layouts of the first UI pattern 310 and the second UI pattern 320 may vary depending on channels. For example, the multimedia content corresponding to the first UI pattern 310 may be a content provided by a paid channel, and the multimedia content corresponding to the second UI pattern 320 may be a content provided by a shopping channel.

The layouts of the first UI pattern 310 and the second UI pattern 320 may vary depending on content providers. For example, the multimedia content corresponding to the first UI pattern 310 may be a content provided from YouTube, and the multimedia content corresponding to the second UI pattern 320 may be a content provided from Facebook.

The layouts of the first UI pattern 310 and the second UI pattern 320 may vary depending on content providing time points. For example, the multimedia content corresponding to the first UI pattern 310 may be a content that is provided live, and the multimedia content corresponding to the second UI pattern 320 may be a content provided from the device such as a DVR.

As described above, the UI patterns may vary depending on various elements. In other words, the type of UI pattern may vary. However, for ease of explanation, two UI patterns will be exemplified as shown in FIG. 3A and FIG. 3B.

Figure 4A:
FIG. 4A and FIG. 4B are diagrams illustrating an example method for obtaining a UI pattern according to various embodiments of the disclosure.
Figure 4B:
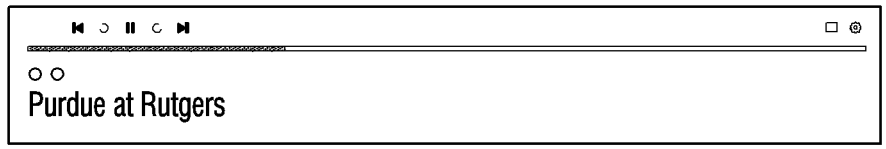

FIG. 4A and FIG. 4B are diagrams illustrating an example method for obtaining a UI pattern according to various embodiments of the disclosure.

The processor 140 may obtain a UI pattern in FIG. 4A from the frame of FIG. 3A. The processor 140 may obtain the UI pattern in FIG. 4B from the frame of FIG. 3B.

The processor 140 may obtain a UI pattern from one of a plurality of frames included in the multimedia content. For example, the processor 140 may obtain a plurality of UI patterns from the plurality of frames included in the multimedia content at predetermined intervals. For example, the processor 140 may obtain the UI pattern for each frame at time intervals of 0.5 second.

The processor 140 may obtain the UI pattern by comparing adjacent two frames among the plurality of frames included in the multimedia content. The processor 140, only when the same image area is identified from consecutive frames equal to or more than a predetermined number among the plurality of frames included in the multimedia content, may obtain the identified image area as a UI pattern.

Figure 5A:
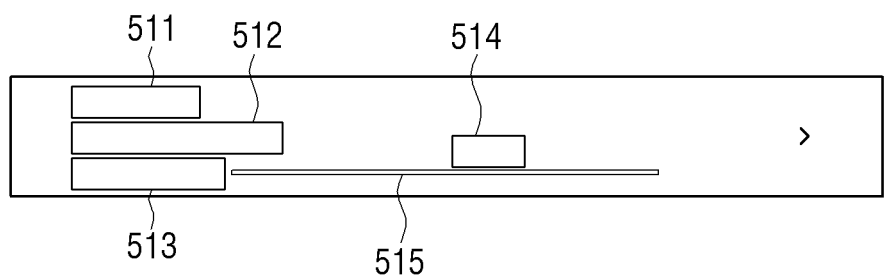
FIG. 5A and FIG. 5B are diagrams illustrating an example method for obtaining UI pattern information according to various embodiments of the disclosure.
Figure 5B:
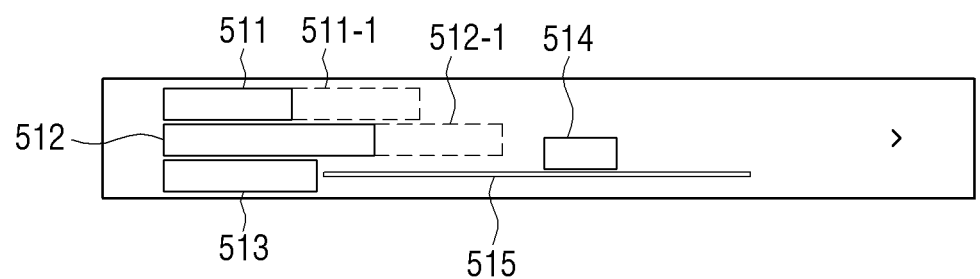

FIG. 5A and FIG. 5B are diagrams illustrating an example method for obtaining UI pattern information according to various embodiments of the disclosure.

The processor 140 may obtain UI pattern information in FIG. 5A from the UI pattern in FIG. 4A. The processor 140 may detect texts from the UI pattern in FIG. 4A, and convert the text area into text boxes 511, 512, 513, 514 (which may be referred to hereinafter as "511 to 514"). In addition, the processor 140 may detect a playback bar of the multimedia content from the UI pattern in FIG. 4A, and convert the playback bar area into the image box 515.

The processor 140 may obtain the similarity with other UI patterns through the conversion. For example, even with the same UI pattern, the object to be displayed may be changed because the title or the like may vary depending on the type of multimedia content. Therefore, the processor 140 may not compare the details of the UI pattern but may generate a layout as shown in FIG. 5A and compare it with other UI patterns.

Referring to FIG. 5B, the processor 140 may change the UI pattern information of FIG. 5A. The processor 140 may obtain UI pattern information including a first margin area 511-1 and a second margin area 512-1 respectively corresponding to the first text box 511 and the second text box 512 from the UI pattern information of FIG. 5A.

For example, after identifying the second text box 512 based on the title of multimedia content (friends) of FIG. 4A, the processor 140 may identify that the UI pattern of the multimedia content is the same as the UI pattern of FIG. 5A based on the second margin area 512-1 even if the multimedia content having a longer title than friends is reproduced.

As described above, the processor 140 may obtain the UI pattern information from the frame.

Figure 6:
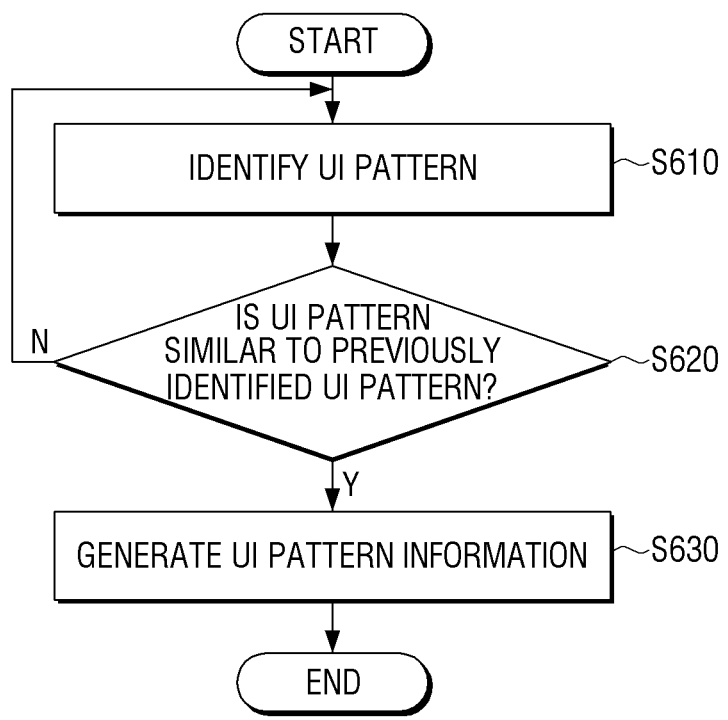
FIG. 6 is a flowchart illustrating an example method for generating UI pattern information according to an embodiment of the disclosure.

FIG. 6 is a flowchart illustrating an example method for generating UI pattern information according to an embodiment of the disclosure. FIGS. 3A, 3B, 4A, 4B, 5A and FIG. 5B illustrate method of identifying a UI pattern from a single frame, but the disclosure is not limited thereto.

The processor 140 may identify a UI pattern in step S610. The processor 140 may identify whether the UI pattern is similar to the previously identified UI pattern in step S620. If the UI pattern is similar to the previously identified UI pattern, the processor 140 may generate UI pattern information based on the UI pattern in step S630.

The processor 140 may generate UI pattern information after the similar UI pattern is identified more than a threshold number of times. The similarity between the UI patterns may be determined based on at least one of a structure, a shape, a size, or an arrangement state of the layout of the UI pattern.

The memory 120 may store UI pattern information with respect to a plurality of UI patterns by repeating the above-process.

Figure 7:
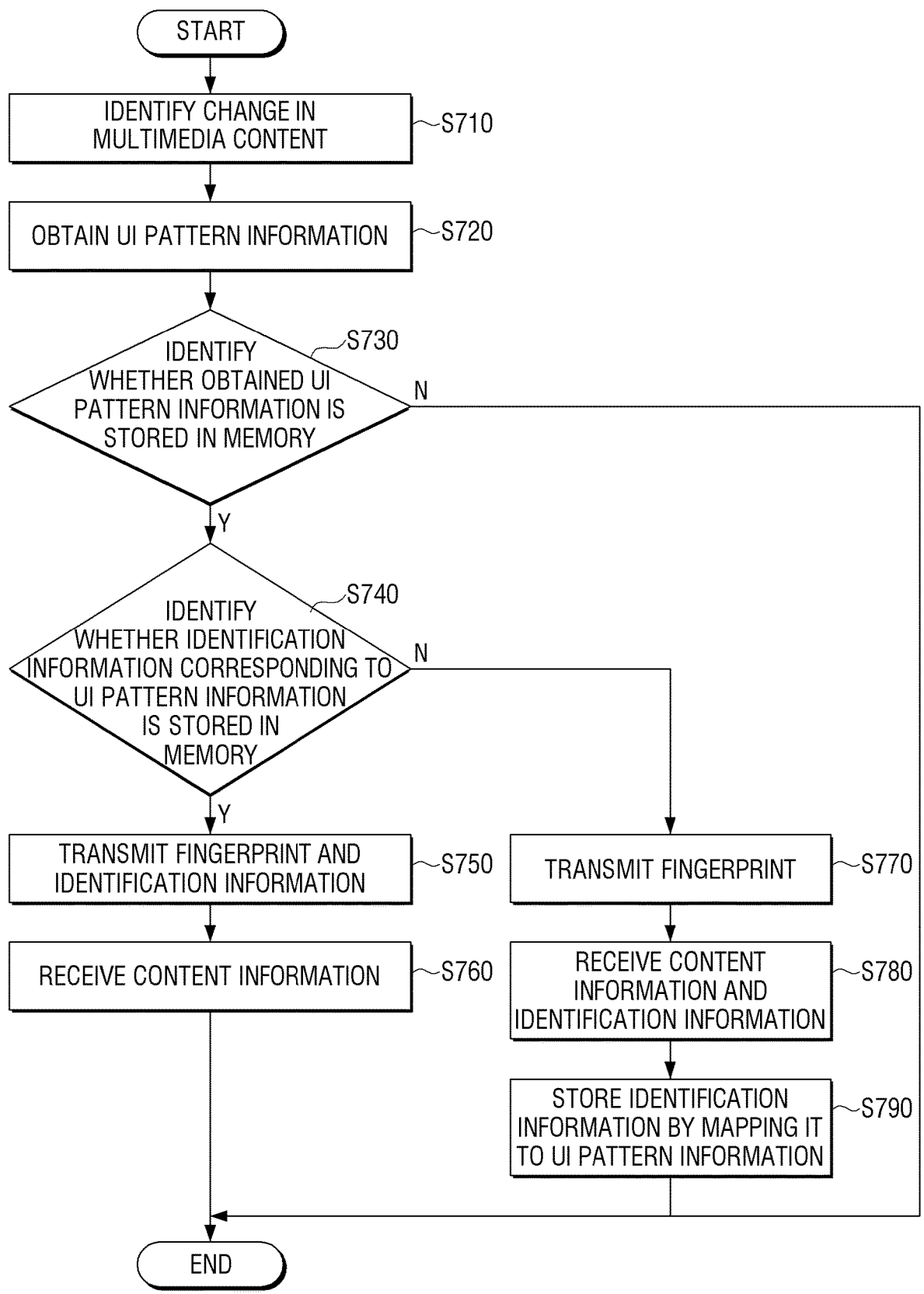
FIG. 7 is a flowchart illustrating an example method for receiving content information according to an embodiment of the disclosure.

FIG. 7 is a flowchart illustrating an example method for receiving content information according to an embodiment of the disclosure.

The processor 140 may identify whether the multimedia content is changed in step S710. For example, the processor 140 may identify that an event that changes a multimedia content occurs when the state of an audio output is changed to a mute state while the multimedia content is being output.

The processor 140 may obtain UI pattern information from the changed multimedia content in step S720. The method of obtaining the UI pattern information has been described. Therefore, the detailed description will be omitted.

The processor 140 may identify whether the obtained UI pattern information is stored in the memory 120 in step S730. The UI pattern information that is pre-stored in the memory 120 may be information obtained according to the process of FIG. 6.

When the obtained UI pattern information is pre-stored in the memory 120, the processor 140 may identify whether the identification information corresponding to the obtained UI pattern information is stored in the memory 120 in step S740. The processor 140 may identify whether the obtained UI pattern information and the identification information corresponding to the obtained UI pattern information are pre-stored in the memory 120.

When the identification information corresponding to the obtained UI pattern information is stored in the memory 120, the processor 140 may transmit fingerprint and identification information to a server in step S750. The fingerprint may be a fingerprint obtained from the changed multimedia content. For example, when the multimedia content is changed, the processor 140 may obtain the fingerprint from the changed multimedia content. The processor 140 may obtain the fingerprint from one of a plurality of frames included in the changed multimedia content.

When the UI pattern information is obtained from the changed multimedia content, the processor 140 may obtain the fingerprint from the changed multimedia content. For example, even if the multimedia content is not changed, the multimedia content itself may not have an audio output, and in this case, a separate UI pattern may not be displayed. The processor 140 may identify that the multimedia content is changed because the audio output becomes mute. However, the processor 140 may not obtain the fingerprint as the UI pattern information is not obtained.

The frame for obtaining the fingerprint and the frame for obtaining the UI pattern information from the changed multimedia content may be different. For example, the processor 140 may obtain the fingerprint at the first frame of the changed multimedia content, but the UI pattern information may, for example, be obtained from the frame after 0.5 second.

The processor 140 may receive content information from the server in step S760.

If the identification information corresponding to the obtained UI pattern information is not stored in the memory 120, the processor 140 may transmit only the fingerprint to the server in step S770. The processor 140 may receive content information and identification information from the server in step S780. The processor 140 may map the identification information to the UI pattern information to store the identification information in step S790.

If the obtained UI pattern information is not pre-stored in the memory 120, the processor 140 may not perform a subsequent operation.

FIG. 7 illustrates transmission of the fingerprint, etc. to the server, and the server may be a main server 200. However, the disclosure is not limited thereto. The processor 140 may transmit the fingerprint to the plurality of sub-servers 210-1 to 210-n. In this case, the processor 140 may not transmit the identification information, but may transmit only the fingerprint. The processor 140 may change the object to be transmitted of the fingerprint according to whether the identification information is obtained. For example, the processor 140, when the identification information is not obtained, may transmit the fingerprint to all of the plurality of sub-servers 210-1 to 210-n. When the identification information is obtained, the processor 140 may transmit the fingerprint to at least one sub-server corresponding to the identification information among the plurality of sub-servers 210-1 to 210-n. A detailed description thereof will be made with reference to FIGS. 8A, 8B and FIG. 8C.

Figure 8A:
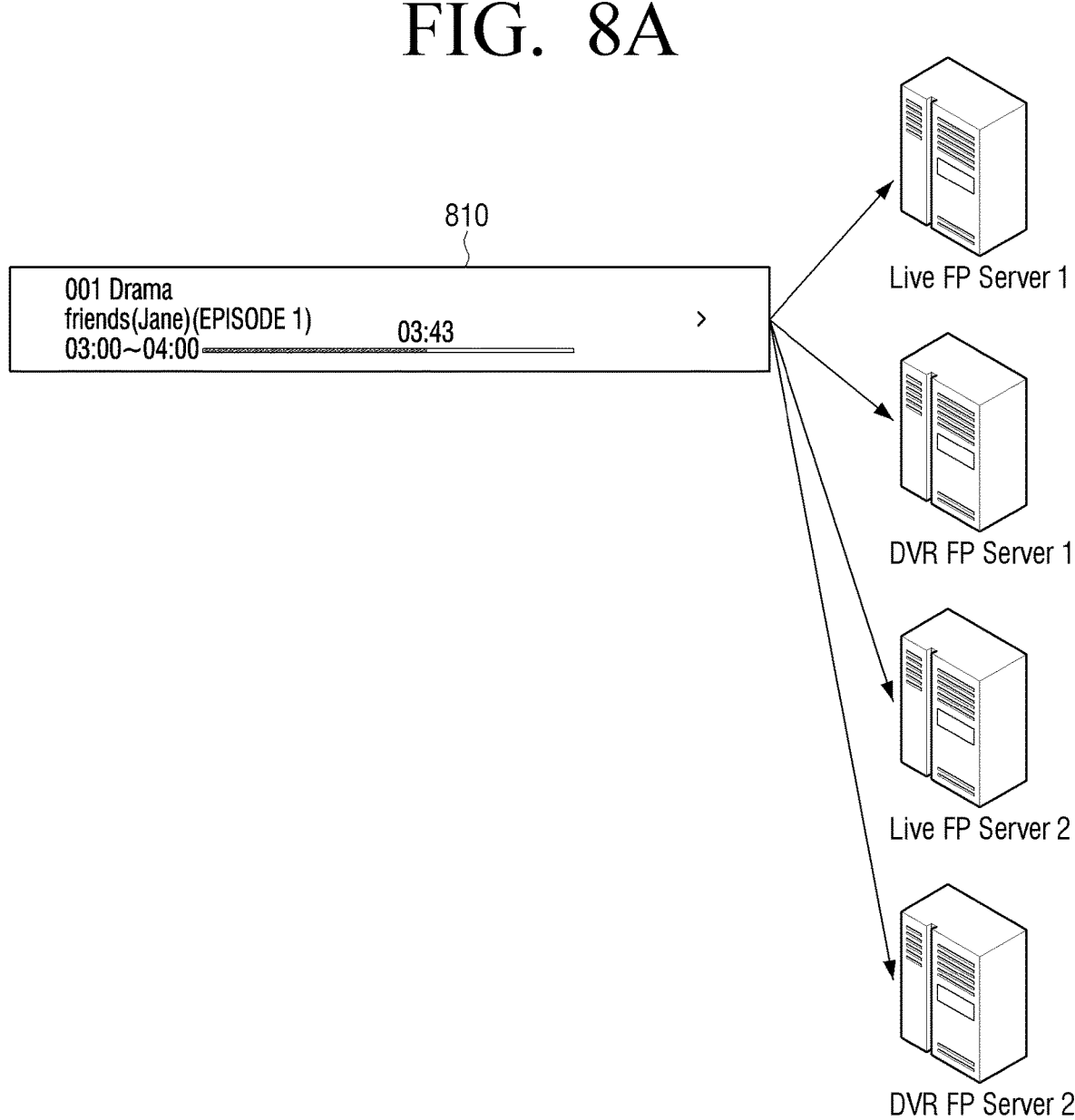
FIG. 8A, 8B and FIG. 8C are diagrams illustrating an example method for using identification information according to an embodiment of the disclosure.
Figure 8B:
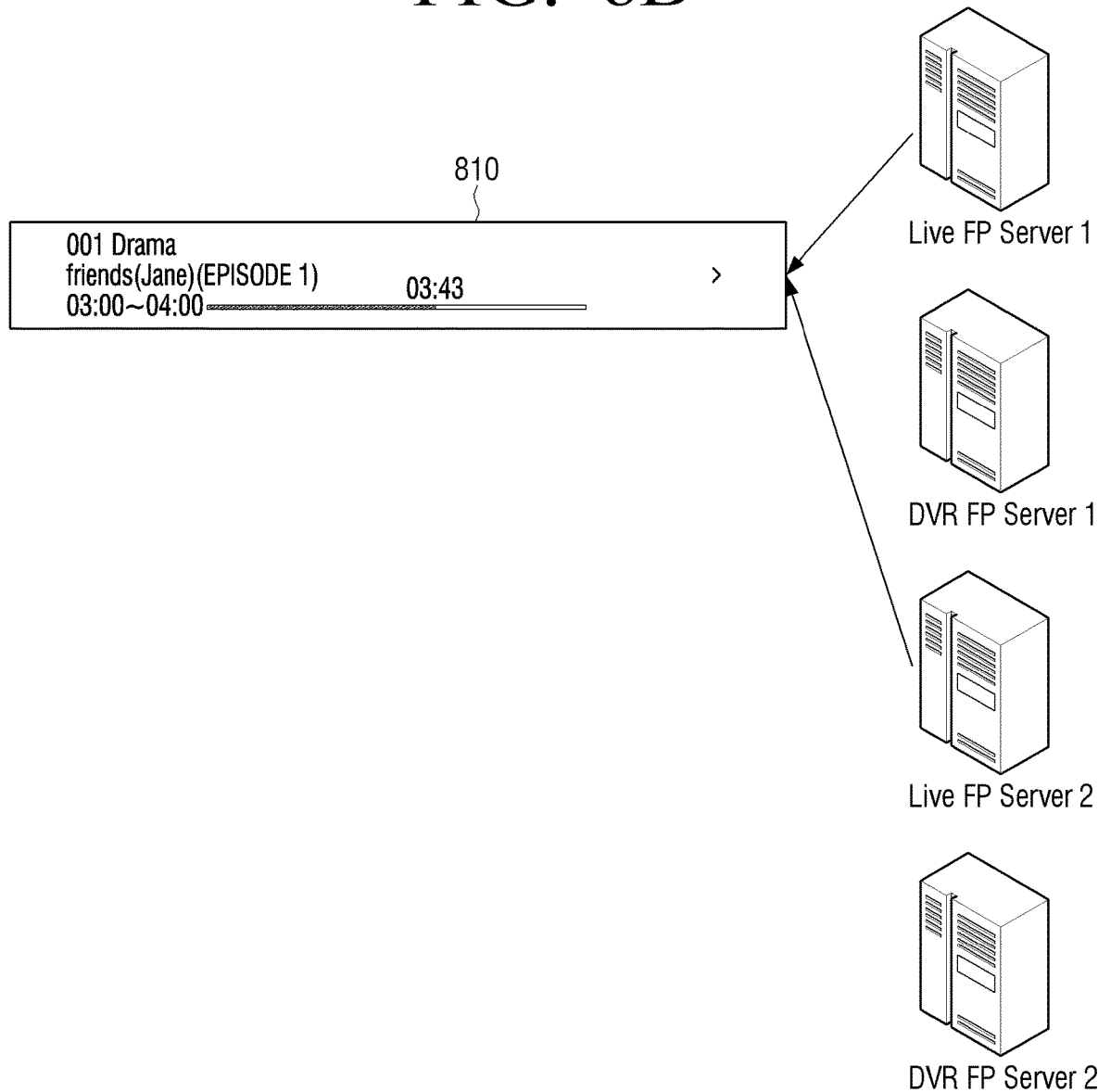
Figure 8C:
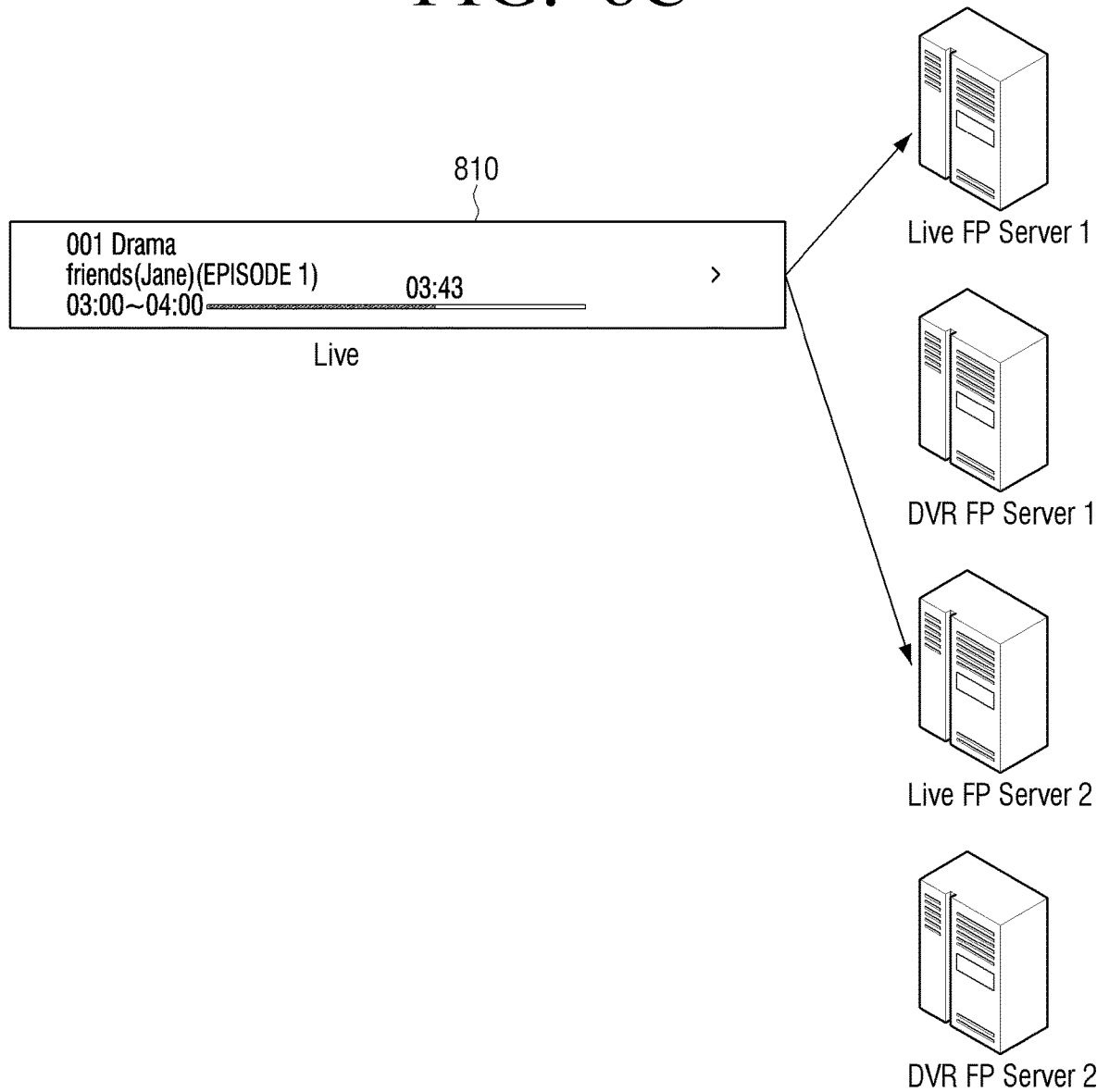

FIGS. 8A, 8B and FIG. 8C are diagrams illustrating an example method for using identification information according to an embodiment of the disclosure. Referring to FIGS. 8A, 8B and 8C, for ease of explanation, two live sub-servers Live FP Server 1 and 2, and two DVR sub-servers DVR FP Server 1 and 2 will illustrated by way of non-limiting example.

Referring to FIG. 8A, the processor 140 may obtain UI pattern information 810. Only the UI pattern information 810 may be stored in the memory 120, and the identification information corresponding to the UI pattern information 810 may not be stored, but the disclosure is not limited thereto.

Accordingly, the fingerprint may be transmitted to 4 (four) sub-servers.

Referring to FIG. 8B, the processor 140 may receive content information corresponding to the fingerprint from two live sub-servers Live FP Server 1 and 2. In this case, the processor 140 may identify that the UI pattern information 810 is a live content based on the two live sub-servers Live FP Server 1 and 2, map the identification information indicating that the UI pattern information is the live content to the UI pattern information 810 and store the identification information.

FIG. 8C illustrates that the processor 140 obtains the UI pattern information 810 after the operations in FIG. 8A and FIG. 8B. It is assumed that the UI pattern information 810 that the processor 140 obtains in FIG. 8C may be the same as the UI pattern information 810 obtained in FIG. 8A.

The processor 140 may identify that the identification information corresponding to the obtained UI pattern information 810 is pre-stored in the memory 120. The processor 140 may transmit the fingerprint to two live sub-servers Live FP Server 1 and 2 based on the identification information indicating that the UI pattern information 810 is a live content. In other words, if the UI pattern information stored in the memory 120 is mapped to the identification information and stored, the processor 140 may transmit the fingerprint to at least one of a plurality of sub-servers.

In addition, referring to FIG. 8C, since search queries are not requested to all servers, the load on the servers may be reduced. For example, when a plurality of fingerprints are transmitted from a plurality of display devices, more servers need to be expanded to distribute the load of the server. However, if the above method is used, the same effect may be provided even if the server facility is reduced.

Figure 9:
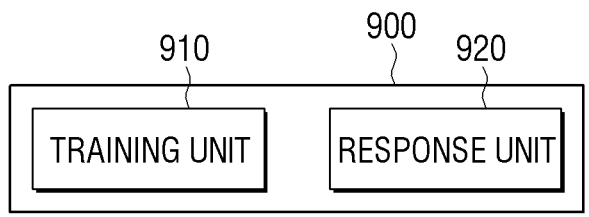
FIG. 9 is a block diagram illustrating an example configuration of another electronic apparatus according to an embodiment of the disclosure.

FIG. 9 is a block diagram illustrating an example configuration of another example electronic apparatus according to an embodiment of the disclosure. Another electronic apparatus may, for example, be an apparatus for obtaining a UI pattern identification model through an artificial intelligence algorithm.

Referring to FIG. 9, another electronic apparatus may include a training unit (e.g., including processing circuitry and/or executable program elements) 910 and a response unit (e.g., including processing circuitry and/or executable program elements) 920.

The training unit 910 may include various processing circuitry and/or executable program elements and generate or train an artificial intelligence model for identifying a UI pattern using training data. The training unit 910 may generate a determination model having a determination reference using collected training data.

The response unit 920 may include various processing circuitry and/or executable program elements and obtain a UI pattern included in a predetermined image using predetermined data as input data of the trained artificial intelligence model.

According to an embodiment, the training unit 910 and the response unit 920 may be included in another electronic apparatus. However, the disclosure is not limited thereto. For example, at least part of the training unit 910 and at least part of the response unit 920 may be embodied as a software module and manufactured in the form of one or a plurality of hardware chips to be mounted on the display apparatus 100. For example, at least one of the training unit 910 and the response unit 920 may be manufactured in the form of a hardware chip for Artificial Intelligence (AI) only, or manufactured as a part of an existing general processor (e.g. a CPU or an application processor) or aa graphic processor (e.g., a GPU) to be mounted on the electronic apparatuses in a variety of types. The hardware chip for Artificial Intelligence (AI) only may be a processor specialized for probability computation having a higher parallel processing performance than the conventional general processor, thereby quickly performing an arithmetic operation in the artificial intelligence field such as machine training. When the training unit 910 and the response unit 920 are implemented as a software module (or a program module including an instruction), the software module may be a non-transitory computer readable media. In this case, the software module may be provided by an operating system (OS) or by a predetermined application. Alternatively, some of the software modules may be provided by an Operating System (OS), and some of the software modules may be provided by a predetermined application.

In this case, the training unit 910 and the response unit 920 may be mounted on a single electronic apparatus or respectively mounted separate electronic apparatuses. For example, one of the training unit 910 and the response unit 920 may be included in the display apparatus 100, and the other one may be included in another electronic apparatus. In addition, the training unit 910 and the response unit 920 may provide the model information established by the training unit 910 to the response unit 920 in a wired or wireless manner, or the data input into the training unit 920 may be provided to the training unit 910 as additional training data.

Figure 10:
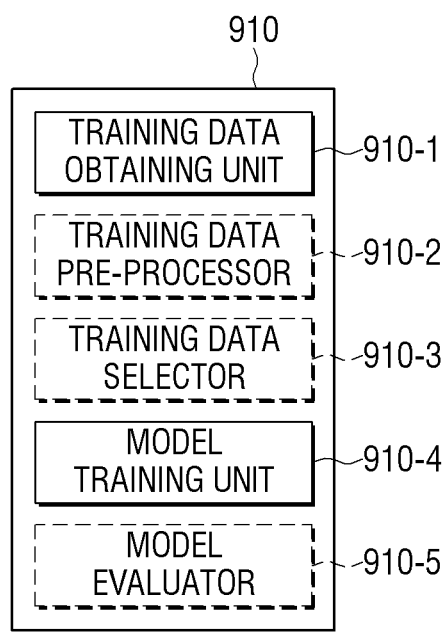
FIG. 10 is a block diagram illustrating an example training unit according to an embodiment of the disclosure.

FIG. 10 is a block diagram illustrating an example training unit according to an embodiment of the disclosure.

Referring to FIG. 10, the training unit 910 may include a training data obtaining unit (e.g., including processing circuitry and/or executable program elements) 910-1 and a model training unit (e.g., including processing circuitry and/or executable program elements) 910-4. The training unit 910 may further include at least one of a training data pre-processor (e.g., including processing circuitry and/or executable program elements) 910-2, a training data selector (e.g., including processing circuitry and/or executable program elements) 910-3, and a model evaluator (e.g., including processing circuitry and/or executable program elements) 910-5.

The training data obtaining unit 910-1 may include various processing circuitry and/or executable program elements and obtain training data necessary for the artificial intelligence model for identifying a UI pattern. According to an embodiment of the disclosure, the training data obtaining unit 910-1 may obtain a plurality of sample frames and a plurality of sample UI patterns included in the plurality of sample frames as training data. The training data may be data collected or tested by the training unit 910 and the manufacturer of the training unit 910.

The model training unit 910-4 may include various processing circuitry and/or executable program elements and train a reference by which an artificial intelligence model identifies a UI pattern using training data. For example, the model training unit 910-4 may train an artificial intelligence model through supervised learning that uses at least part of training data as criteria. The model training unit 910-4 may train an artificial intelligence model through unsupervised learning by training itself using training data without any guidance. The model training unit 910-4 may train the artificial intelligence model through reinforcement learning using a feedback as to whether the result of the situation determination based on the training is correct. The model training unit 910-4 may also train the artificial intelligence model using, for example, a learning algorithm including an error back-propagation or a gradient descent.

The model training unit 910-4 may train screening criteria as to which training data is to be used for identifying a UI pattern using input data.

When a pre-established artificial intelligence model include a plurality of artificial intelligence models, the model training unit 910-4 may determine an artificial intelligence model with high correlation between input training data and basic training data as an artificial intelligence model to be trained. In this case, the basic training data may be pre-classified for each type of data, and the artificial intelligence model may be pre-established for each type of data.

When the artificial intelligence model is trained, the model training unit 910-4 may store the trained artificial intelligence model. The model training unit 910-4 may store the trained artificial intelligence model in a memory of another electronic apparatus. The model training unit 910-4 may store the trained artificial intelligence model to a server connected to another electronic apparatus in a wired or wireless manner or a memory of the electronic apparatus.

The training unit 910 may further include the training data pre-processor 910-2 and the training data selector 910-3 in order to improve the response result of the artificial intelligence model or save resources or time required for generating the artificial intelligence model.

The training data pre-processor 910-2 may include various processing circuitry and/or executable program elements and perform pre-processing of the obtained data so that the obtained data may be used for training to identify a UI pattern from an image. In other words, the training data pre-processor 910-2 may manufacture the obtained data in a predetermined format. For example, the training data pre-processor 910-2 may divide a sample frame into a plurality of areas.

The training data selector 910-3 may include various processing circuitry and/or executable program elements and select data necessary for training from between the data obtained from the training data obtaining unit 910-1 and the data pre-processed by the training data pre-processor 910-2. The selected training data may be provided to the model training unit 910-4. The training data selector 910-3 may select training data necessary for training from the obtained or pre-processed data according to a predetermined reference. The training data selector 910-3 may select training data according to a predetermined reference due to the training of the model training unit 910-4.

The training unit 910 may further include the model evaluator 910-5 to improve the response result of the artificial intelligence model.

The model evaluator 910-5 may include various processing circuitry and/or executable program elements and input evaluation data into an artificial intelligence model, and when a response result output from evaluation data fails to satisfy a predetermined reference, may allow the model training unit 910-4 to train again. In this case, the evaluation data may be pre-defined data for evaluating an artificial intelligence model.

When the trained artificial intelligence models includes a plurality of trained artificial intelligence models, the model evaluator 910-5 may evaluate whether each trained artificial intelligence model satisfies a predetermined reference, and determine an artificial intelligence model that satisfies a predetermined reference as a final artificial intelligence model. In this case, when there are a plurality of models satisfying a predetermined criterion, the model evaluator 910-5 may determine any one or a predetermined number of models which are preset in the order of the highest evaluation score as the final AI model.

Figure 11:
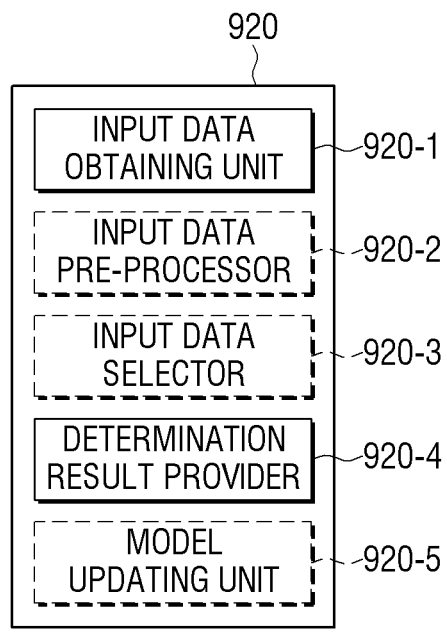
FIG. 11 is a block diagram illustrating an example response unit according to an embodiment of the disclosure.

FIG. 11 is a block diagram illustrating an example response unit according to an embodiment of the disclosure.

Referring to FIG. 11, a response unit 920 according to some embodiments may include an input data obtaining unit (e.g., including processing circuitry and/or executable program elements) 920-1 and a response result provider (e.g., including processing circuitry and/or executable program elements) 920-4.

The response unit 920 may include at least one of an input data pre-processor (e.g., including processing circuitry and/or executable program elements) 920-2, an input data selector (e.g., including processing circuitry and/or executable program elements) 920-3, and a model updating unit (e.g., including processing circuitry and/or executable program elements) 920-5.

The input data obtaining unit 920-1 may include various processing circuitry and/or executable program elements and obtain data necessary for identifying a UI pattern. The response result provider 920-4 may include various processing circuitry and/or executable program elements and identify a UI pattern from an image by applying the input data obtained from the input data obtaining unit 920-1 to the trained artificial intelligence model as an input value. The response result provider 920-4 may obtain a response result by applying the data selected by the input data pre-processor 920-2 or the input data selector 920-3 to the artificial intelligence model as an input value. The response result may be determined by the artificial intelligence model.

According to an embodiment, the response result provider 920-4 may identify a UI pattern from an image by applying the UI pattern obtained from the input data obtaining unit 920-1 to the artificial intelligence model.

The response unit 920 may further include the input data pre-processor 920-2 and the input data selector 920-3 in order to improve the response result of the artificial intelligence model, or save the resource or time for providing the response result.

The input data pre-processor 920-2 may include various processing circuitry and/or executable program elements and perform pre-processing of the obtained data so that the data obtained for identifying the UI pattern may be used. The input data pre-processor 920-2 may manufacture the data the response result provider 920-4 obtains in a predefined format.

The input data selector 920-3 may include various processing circuitry and/or executable program elements and select data necessary for providing a response from the data obtained from the data obtaining unit 920-1 or the data pre-processed by the input data pre-processor 920-2. The selected data may be provided to the response result provider 920-4. The input data selector 920-3 may select part of some of the obtained or pre-processed data according to a predetermined determination reference for providing a response. The input data selector 920-3 may select data according to a predetermined determination reference by the training of the model training unit 910-4.

The model updating unit 920-5 may include various processing circuitry and/or executable program elements and control to update an artificial intelligence model based on the evaluation of the response result provided by the response result provider 920-4. For example, the model updating unit 920-5 may provide the response result provided by the response result provider 920-4 to the model training unit 910-4, and request the model training unit 910-4 to further train or update an artificial intelligence model.

Figure 12:
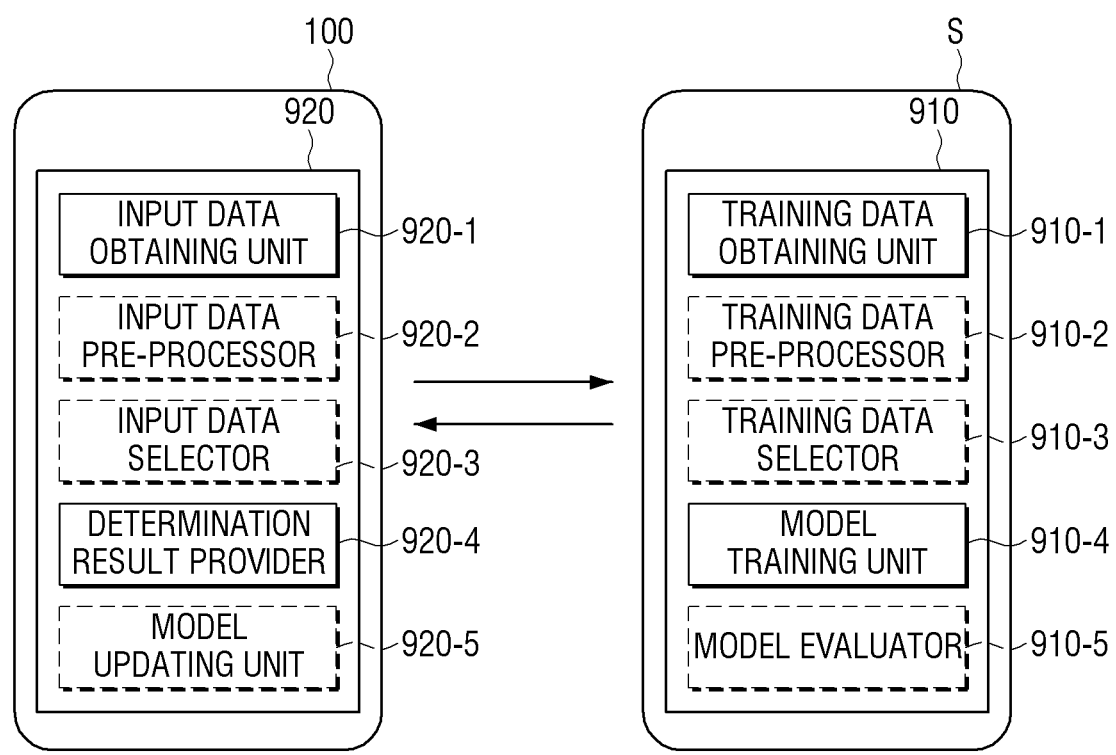
FIG. 12 is a diagram illustrating an example to train and determine data as an electronic apparatus and an external server are linked to each other.

FIG. 12 is a diagram illustrating an example to train and determine data as an display apparatus 100 and an external server S are linked to each other.

Referring to FIG. 12, an external server S may train a reference to identify a UI pattern from an image, and the display apparatus 100 may identify a UI pattern from an image based on the training result by the server (S).

In this case, the model training unit 910-4 of the server (S) may perform the function of the training unit 910 in FIG. 10. In other words, the model training unit 910-4 may train which image information is to be used to identify the UI pattern, and how to identify the UI pattern using the above information.

The response result provider 920-4 of the display apparatus 100 may identify a UI pattern from an image by applying the data selected by the input data selector 920-3 to the artificial intelligence model generated by the server (S). The response result provider 920-4 of the display apparatus 100 may receive the artificial intelligence model generated by the server (S) from the server (S), and identify a UI pattern from the image using the received artificial intelligence model.

FIG. 13 is a flowchart illustrating an example method for controlling a display apparatus according to an embodiment of the disclosure.

When an event that changes a multimedia content output through a display of a display apparatus occurs, identification information indicating the type of multimedia content may be obtained based on the UI pattern information obtained from the changed multimedia content may be obtained in step S1310. The identification information and the fingerprint obtained from the changed multimedia content may be transmitted to the server in step S1320. In addition, the content information corresponding to the fingerprint obtained based on the identification information may be received in step S1330.

The transmitting S1320 may include transmitting the fingerprint to at least one server corresponding to identification information among a plurality of servers, and the receiving S1330 may include receiving content information from at least one server.

When the transmitting S1320 may include transmitting the fingerprint to a plurality of servers when the identification information corresponding to the obtained UI pattern information is not obtained, and the receiving S1330 may include receiving content information and identification information from one of a plurality of servers, and the controlling method may further include mapping the received identification information to the UI pattern information to store the identification information.

The obtaining S1310 may include identifying that an event that changes a multimedia content occurs when an audio output is changed to a mute state while a multimedia content is being output.

The obtaining S1130 may include, if an event occurs, obtaining a plurality of UI patterns from the changed multimedia content at predetermined time intervals, and obtaining UI pattern information from a plurality of UI patterns.

In addition, the method may further include identifying a plurality of UI patterns from each of the plurality of multimedia contents at predetermined time intervals, grouping a plurality of UI patterns based on the similarity of the plurality of UI patterns, and storing the grouped UI pattern as UI pattern information.

The obtaining S1310 may include obtaining UI pattern information from the changed multimedia content based on a UI pattern identification model, and the UI pattern identification model may obtain a plurality of sample frames and a plurality of sample UI patterns included in the plurality of sample frames by training through an artificial intelligence algorithm.

The obtaining S1310 may include identifying whether the obtained UI pattern information corresponds to the pre-stored UI pattern information based on the UI pattern identification model.

The obtaining S1310 may include changing the resolution of the frame included in the multimedia content to a predetermined resolution, and obtaining UI pattern information from the frame changed to a predetermined resolution.

The identification information may include at least one of a channel that provides a multimedia content, a content provider that provides a multimedia content, and a connection method of an electronic apparatus that provides a multimedia content and a display apparatus.

According to various example embodiments of the disclosure, the display apparatus may reduce the server query of the server by constructing the UI pattern information and providing identification information indicating the type of multimedia content obtained from the constructed UI pattern information to the server, thereby reducing the server construction costs.

Various example embodiments of the present disclosure may include software including commands stored in machine-readable storage media that can be read by a machine (e.g., a computer). The machine may be an apparatus that calls a command stored in a storage medium and is operable according to the called command, including an electronic apparatus in accordance with the disclosed example embodiments (e.g., an electronic apparatus). When the command is executed by a processor, the processor may perform the function corresponding to the command, either directly or under the control of the processor, using other components. The command may include code generated by a compiler or a code executable by an interpreter. The machine-readable storage medium may be provided in the form of a non-transitory storage medium. The 'non-transitory' storage medium does not include a signal but is tangible, and does not distinguish whether data is stored semi-permanently or temporarily on a storage medium.

According to an embodiment, the method according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., PlayStore™). In the case of on-line distribution, at least a portion of the computer program product may be temporarily stored, or temporarily created, on a storage medium such as a manufacturer's server, a server of an application store, or a memory of a relay server.

In some cases, the embodiments described herein may be implemented by processor 130 itself. According to software implementation, embodiments such as the procedures and functions described herein may be implemented in separate software modules. Each of the software modules may perform one or more of the functions and operations described herein.

Computer instructions for performing the processing operation of the device according to the various embodiments described above may be stored in a non-transitory computer-readable medium. The computer instructions stored in the non-transitory computer readable medium allow the specific device to perform processing operations in the device according to the above-described various embodiments when executed by the processor of the specific device. The non-transitory computer readable medium may refer, for example, to a medium that stores data semi-permanently, and is readable by an apparatus. For example, the above-described various applications or programs may be stored in a non-transitory computer readable medium such as, for example, and without limitation, a compact disc (CD), a digital versatile disk (DVD), a hard disk, a Blu-ray disk, a universal serial bus (USB) memory stick, a memory card, a read only memory (ROM), or the like.

Each of the components (e.g., modules or programs) according to various embodiments may consist of a single entity or a plurality of entities, and some subcomponents of the abovementioned subcomponents may be omitted, or other components may be further included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although various example embodiments have been illustrated and described, it will be appreciated by those skilled in the art that changes may be made to these embodiments without departing from the principles and spirit of the disclosure. Accordingly, the scope of the disclosure is not limited to the described embodiments, and may be defined, for example, by the appended claims as well as equivalents thereto.

What is claimed is:

1. A display apparatus, comprising:
a display;
a memory configured to store UI (User Interface) pattern information;
a communication interface comprising communication circuitry; and
a processor configured to control the display apparatus to:
output multimedia content though the display;
based on an event that changes the multimedia content output through the display occurring, obtain a plurality of UI patterns from frames in the changed multimedia content at predetermined time intervals during output of the changed multimedia content, wherein obtaining the plurality of UI patterns includes converting text areas in the frames into text boxes and converting content reproduction controls in the frames into image boxes;
obtain UI pattern information from the plurality of UI patterns;

obtain identification information indicating a type of changed multimedia content from the memory based on the obtained UI pattern information;

control the communication interface to transmit the identification information and a fingerprint obtained from the changed multimedia content to a server; and receive content information corresponding to the fingerprint obtained based on the identification information from the server through the communication interface.

2. The display apparatus as claimed in claim 1, wherein the processor is further configured to control the communication interface to: transmit the fingerprint to at least one server corresponding to the identification information among a plurality of servers, and receive the content information from the at least one server.

3. The display apparatus as claimed in claim 1, wherein the processor is further configured to control the display apparatus to:

control the communication interface to transmit the fingerprint to a plurality of servers based on the identification information corresponding to the obtained UI pattern information not being stored in the memory, receive the content information and the identification information from one of the plurality of servers through the communication interface, and map the received identification information to the UI pattern information to store the identification information in the memory.

4. The display apparatus as claimed in claim 1, wherein the processor is further configured to control the display apparatus to: identify that an event that changes the multimedia content occurs based on an audio output being changed to a mute state while the multimedia content is being output.

5. The display apparatus as claimed in claim 1, wherein the processor is further configured to control the display apparatus to:

identify a plurality of UI patterns from each of a plurality of multimedia contents output through the display at predetermined time intervals, perform grouping of the plurality of UI patterns from the plurality of multimedia contents based on a similarity of the plurality of UI patterns from the plurality of multimedia contents, and store the grouped UI pattern in the memory as the UI pattern information.

6. The display apparatus as claimed in claim 1, wherein the processor is further configured to control the display apparatus to:

obtain the UI pattern information from the changed multimedia content based on a UI pattern identification model stored in the memory, wherein the UI pattern identification model is obtained by training a plurality of sample frames and a plurality of sample UI patterns included in the plurality of sample frames through an artificial intelligence algorithm.

7. The display apparatus as claimed in claim 6, wherein the processor is further configured to control the display apparatus to identify whether the obtained UI pattern information corresponds to the stored UI pattern information based on the UI pattern identification model.

8. The display apparatus as claimed in claim 1, wherein the processor is further configured to control the display apparatus to change a resolution of a frame included in the multimedia content to a predetermined resolution, and obtain the UI pattern information from a frame changed to the predetermined resolution.

9. The display apparatus as claimed in claim 1, wherein the identification information includes at least one of a channel that provides the multimedia content, a content provider that provides the multimedia content, or a connection method of an electronic apparatus that provides the multimedia content and the display apparatus.

10. A method for controlling a display apparatus, the method comprising:

outputting multimedia content though a display;

based on an event that changes the multimedia content output through the display occurring, obtaining a plurality of UI (User Interface) patterns from frames in the changed multimedia content at predetermined time intervals during output of the changed multimedia content, wherein obtaining the plurality of UI patterns includes converting text areas in the frames into text boxes and converting content reproduction controls in the frames into image boxes;

obtaining UI pattern information from the plurality of UI patterns;

obtaining identification information indicating a type of changed multimedia content based on the obtained UI pattern information;

transmitting the identification information and a fingerprint obtained from the changed multimedia content to a server; and receiving content information corresponding to the fingerprint obtained based on the identification information from the server.

11. The method as claimed in claim 10, wherein the transmitting comprises transmitting the fingerprint to at least one server corresponding to the identification information among a plurality of servers, and wherein the receiving comprises receiving the content information from the at least one server.

12. The method as claimed in claim 10, wherein the transmitting comprises, transmitting the fingerprint to a plurality of servers based on the identification information corresponding to the obtained UI pattern information not being obtained, wherein the receiving comprises receiving the content information and the identification information from one of the plurality of servers, and wherein the controlling comprises mapping the received identification information to the UI pattern information and storing the identification information.

13. The method as claimed in claim 10, wherein the obtaining comprises identifying that an event that changes the multimedia content occurs based on an audio output being changed to a mute state while the multimedia content is being output.

14. The method as claimed in claim 10, comprising:

identifying a plurality of UI patterns from each of a plurality of multimedia contents output through the display at predetermined time intervals;

performing grouping of the plurality of UI patterns from the plurality of multimedia contents based on a similarity of the plurality of UI patterns from the plurality of multimedia contents; and storing the grouped UI pattern as the UI pattern information.

15. The method as claimed in claim 10, wherein the obtaining comprises obtaining the UI pattern information from the changed multimedia content based on a UI pattern identification model, and wherein the UI pattern identification model is obtained by training a plurality of sample frames and a plurality of sample UI patterns included in the plurality of sample frames through an artificial intelligence algorithm.

16. The method as claimed in claim 15, wherein the obtaining comprises identifying whether the obtained UI pattern information corresponds to pre-stored UI pattern information based on the UI pattern identification model.

17. The method as claimed in claim 10, wherein the obtaining comprises changing a resolution of a frame included in the multimedia content to a predetermined resolution, and obtaining the UI pattern information from a frame changed to the predetermined resolution.

18. The method as claimed in claim 10, wherein the identification information includes at least one of a channel that provides the multimedia content, a content provider that provides the multimedia content, or a connection method of an electronic apparatus that provides the multimedia content and the display apparatus.

* * * * *